June 30, 1964 E. A. LAINE 3,139,024
COIL HANDLING APPARATUS
Filed July 24, 1962 10 Sheets-Sheet 1
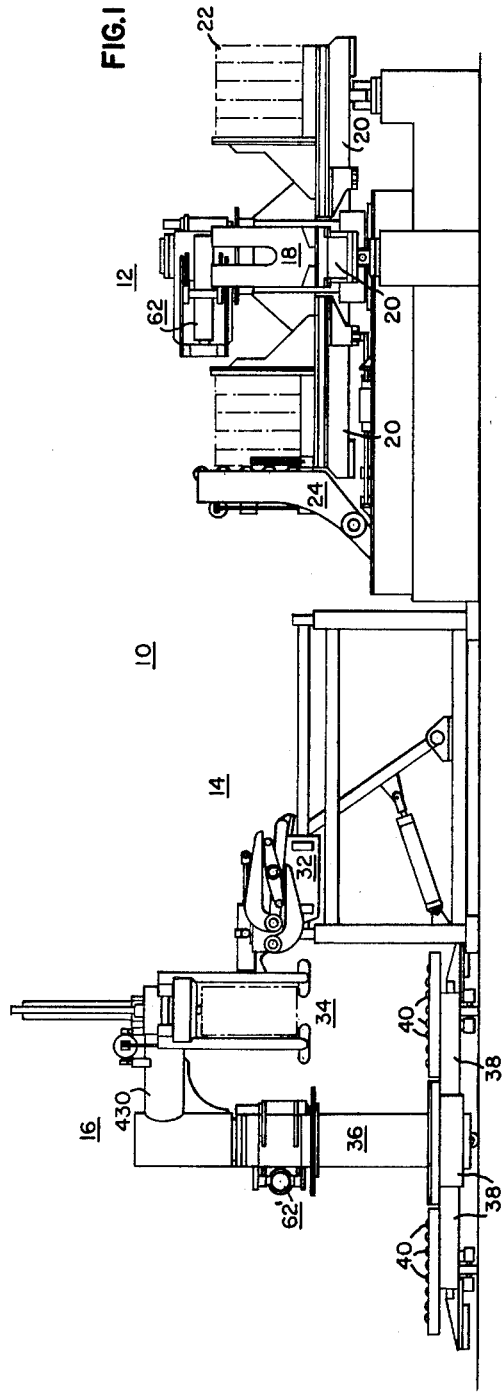
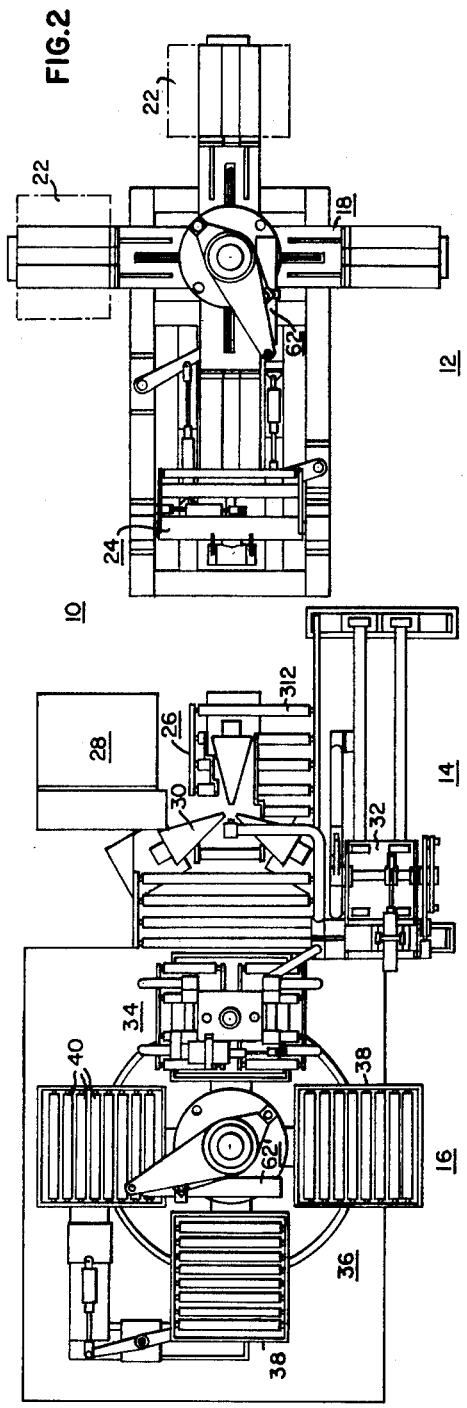

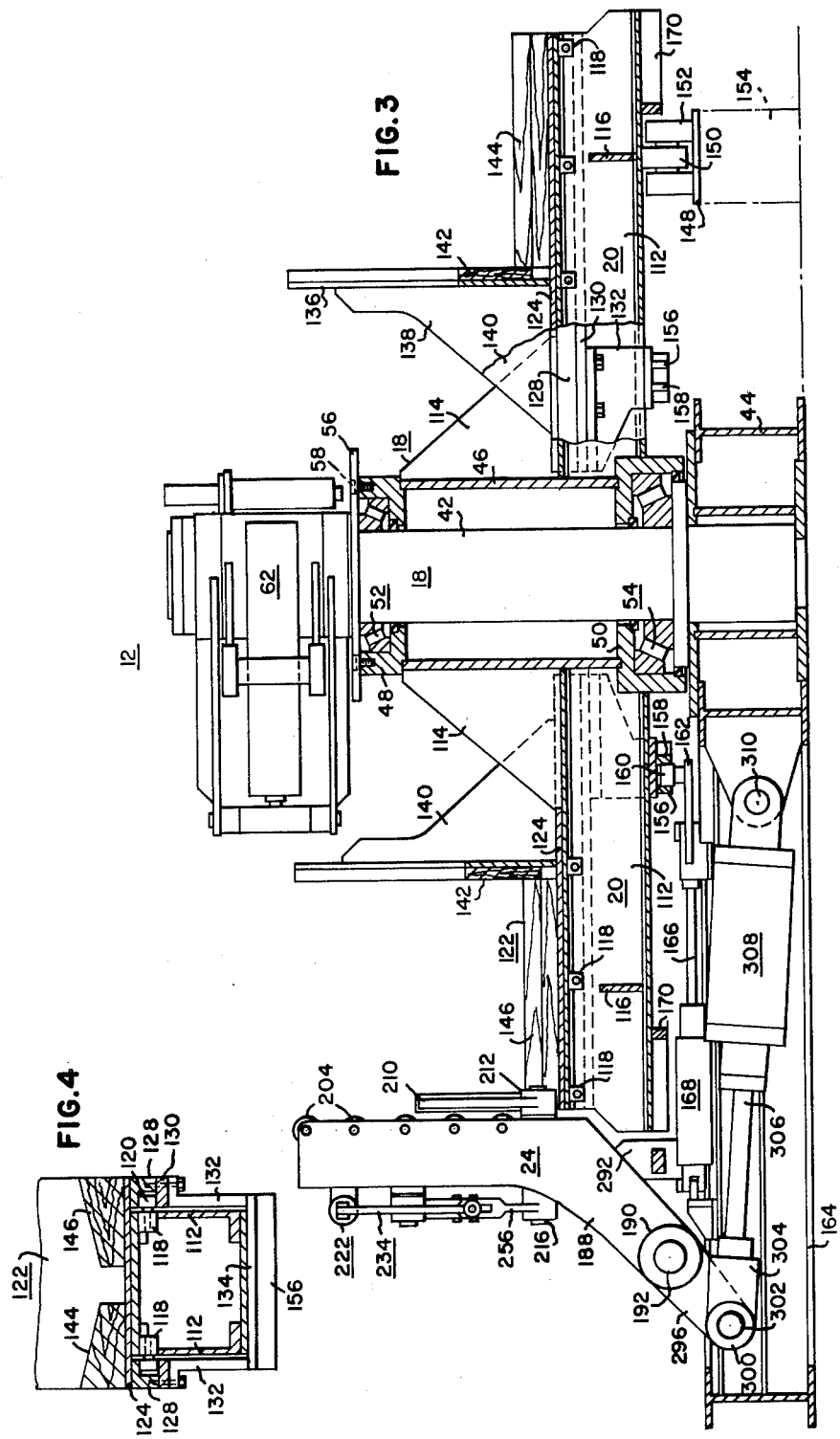

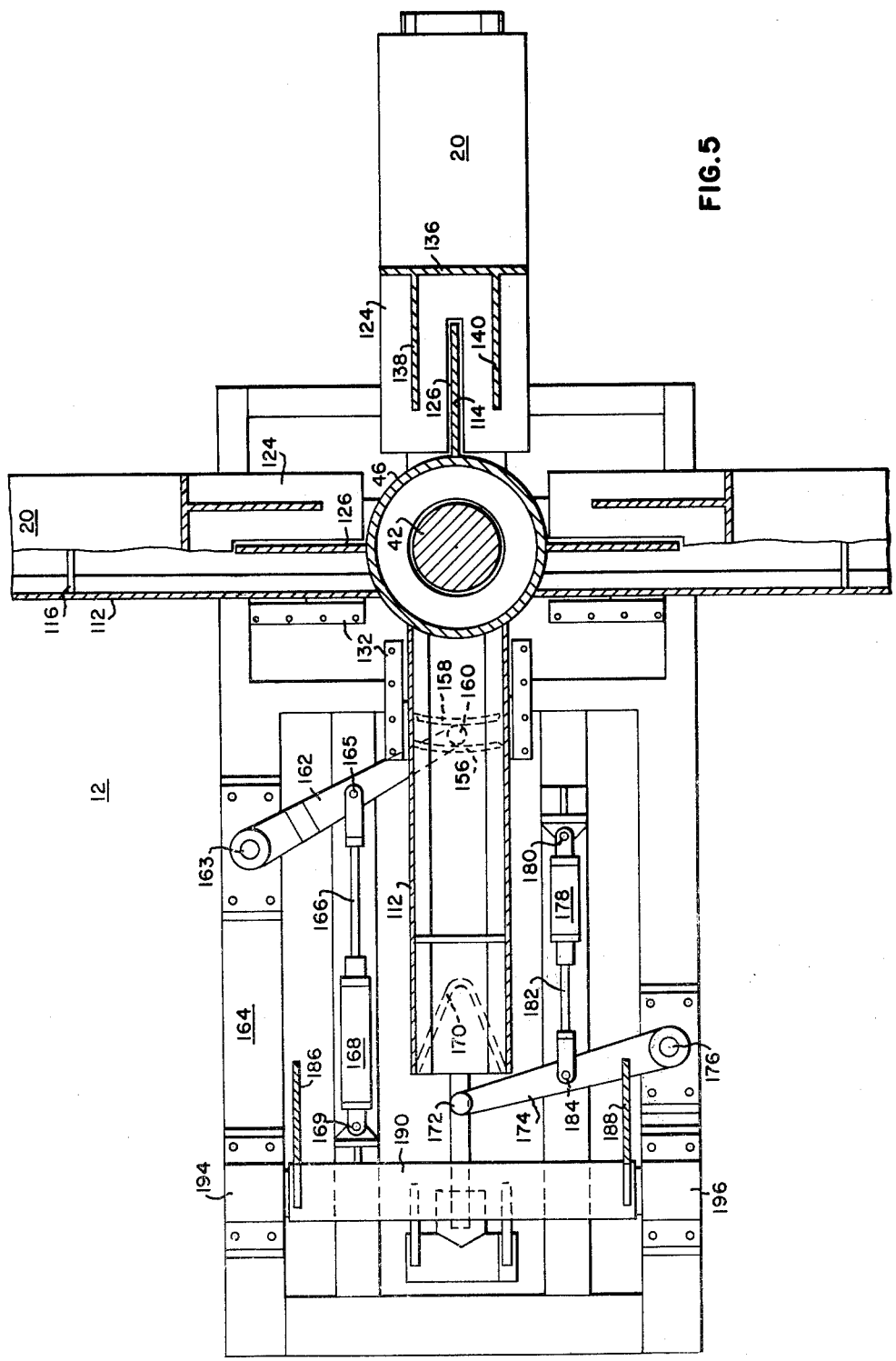

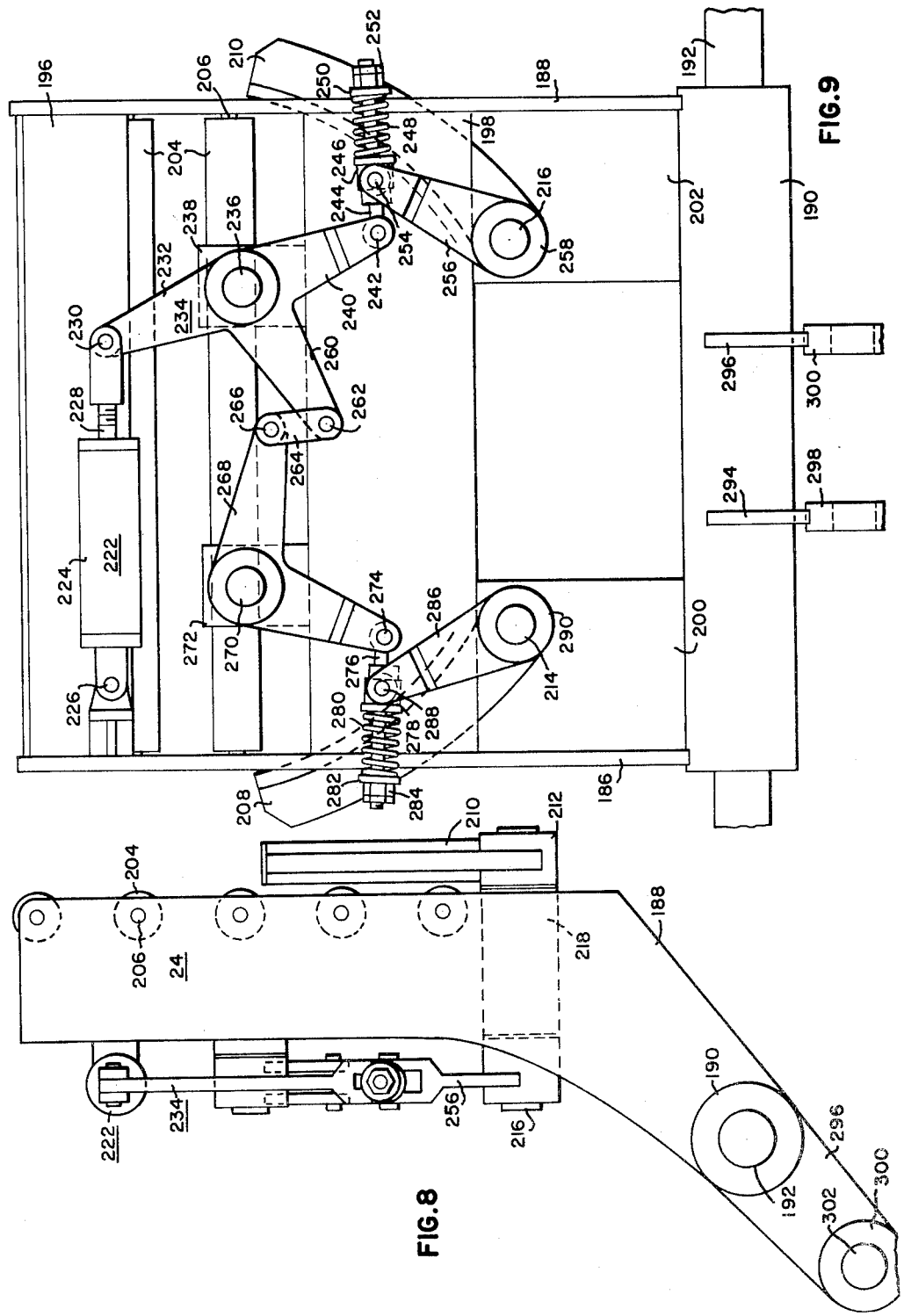

June 30, 1964  E. A. LAINE  3,139,024
COIL HANDLING APPARATUS
Filed July 24, 1962  10 Sheets-Sheet 6
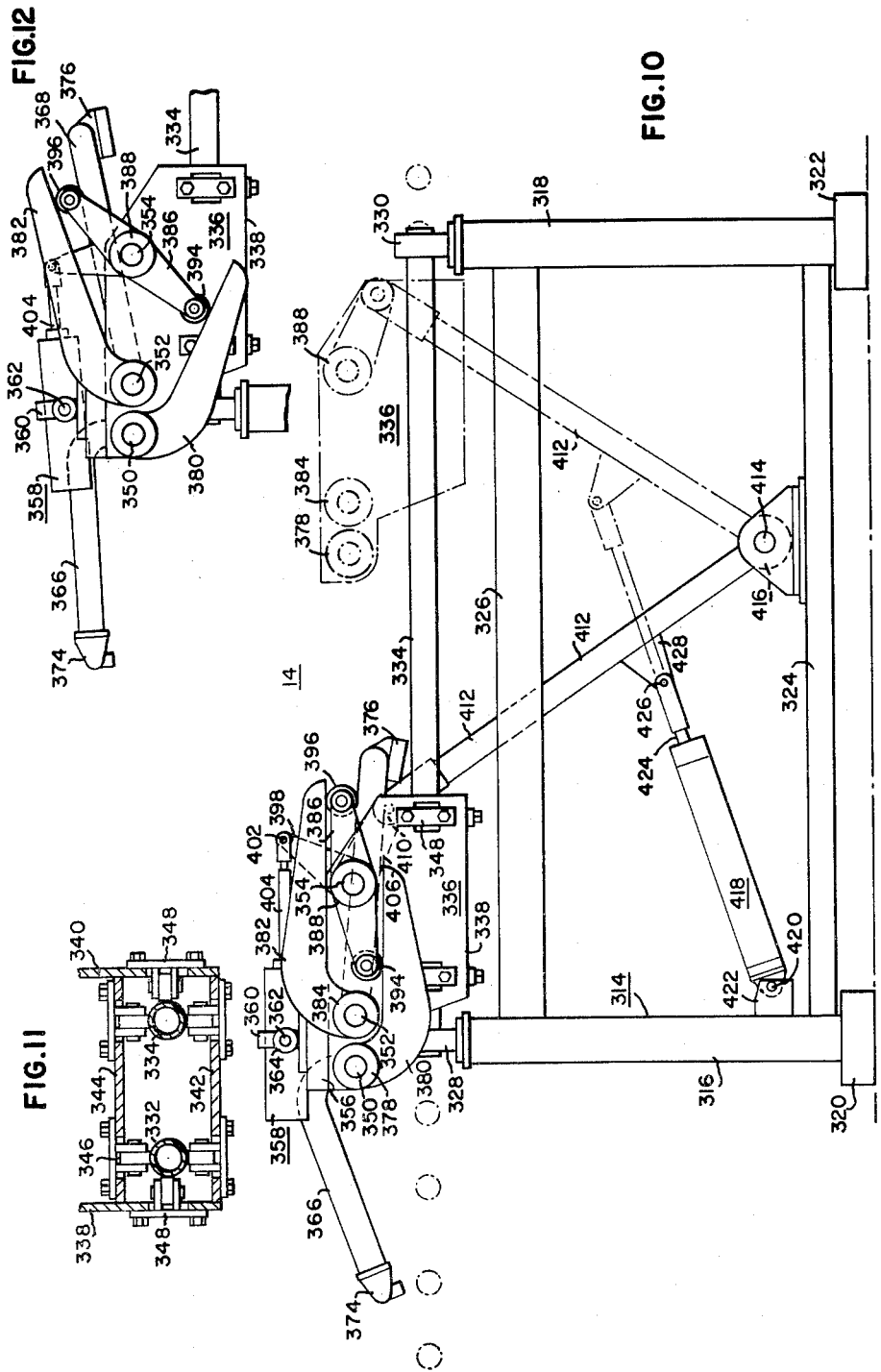

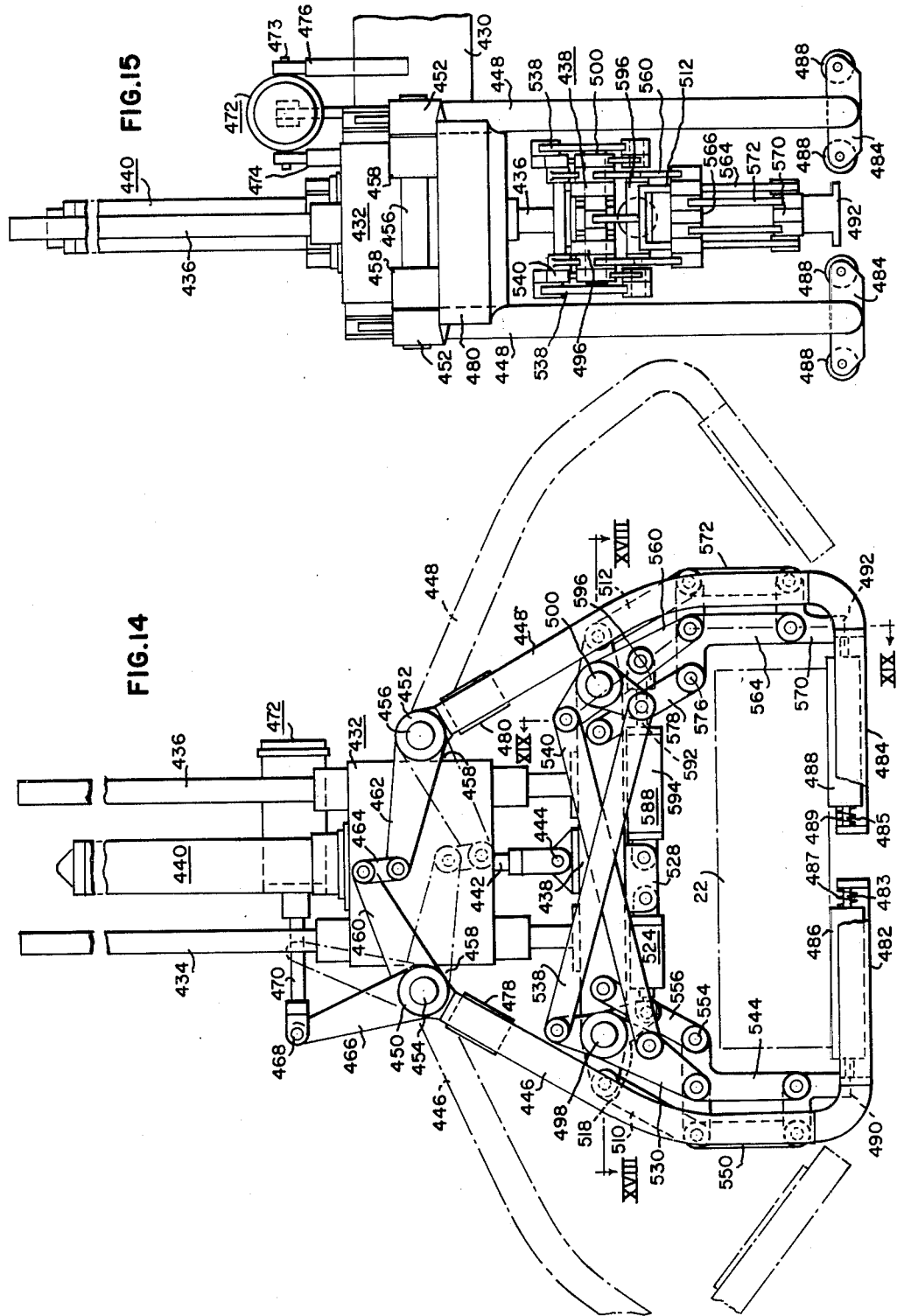

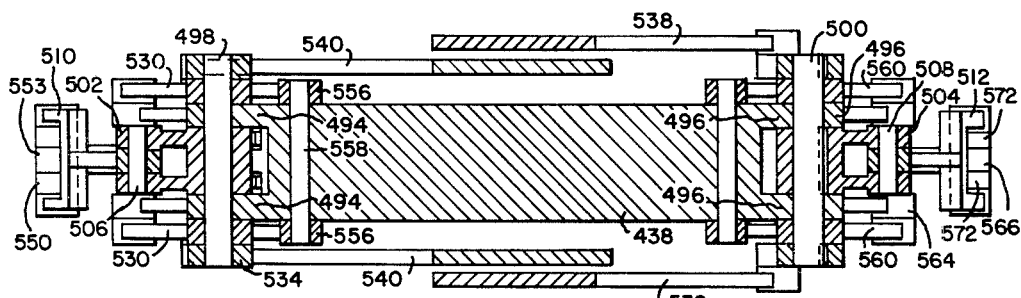
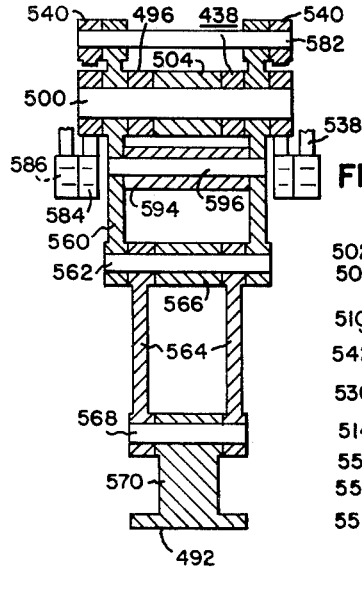
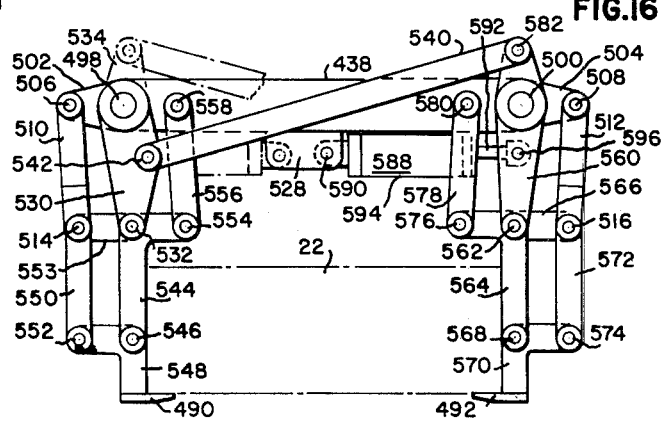
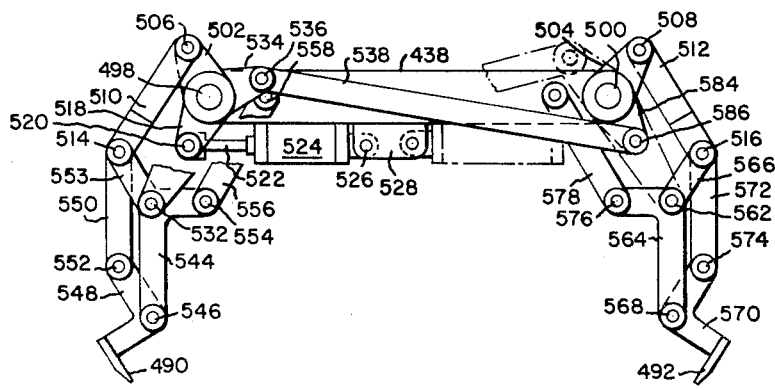

June 30, 1964     E. A. LAINE     3,139,024

COIL HANDLING APPARATUS

Filed July 24, 1962     10 Sheets-Sheet 10

United States Patent Office 3,139,024
Patented June 30, 1964

3,139,024
COIL HANDLING APPARATUS
Edward A. Laine, Leechburg, Pa., assignor to Allegheny Ludlum Steel Corporation, Brackenridge, Pa., a corporation of Pennsylvania
Filed July 24, 1962, Ser. No. 211,993
15 Claims. (Cl. 100—7)

This invention relates to coil handling apparatus and in particular to apparatus for supplying, conveying and removing coils of steel and the like through a banding operation.

When steel such as stainless, electrical silicon-iron, or the like is rolled and finished in wide strip form, such strip is usually slit into predetermined widths and the resulting slit strips are wound into coils. Usually such coils are formed having predetermined inner diameters and are banded prior to shipment to facilitate handling and to prevent damage to the strip or the introduction of strains therein during shipment.

Many different attempts have been made to develop a compact, simplified banding station which would efficiently accommodate the slit coil and handle the same during a banding operation but prior to this invention no known equipment has been available which would provide for the efficient supply, conveying and removing of coils through a banding operation so that a steady flow of coils could be maintained for an efficient operation.

An object of this invention is to provide coil handling apparatus for insuring a uniform progressive supply, conveyance and removal of coils through a coil banding operation.

Another object of this invention is to provide a coil handling apparatus having a coil supplying station for providing a substantially uniform, constant supply of coils to a banding table, a coil removing station for providing a substantially uniform, constant removal of coils from the banding table, and an indexing means for progressively advancing in a substantially uniform step by step manner coils from the supply station to a banding position on the banding table and from thence to the removing station.

Another object of this invention is to provide, in a coil handling apparatus, a supply turnstile having a coil carrying carriage carried on each of the arms thereof that is movable lengthwise thereof in only a predetermined coil discharge position of the arms to advance the coils carried thereby to a predetermined coil discharge position, and releasable means to lock the turnstile arms in the coil discharge position.

A further object of this invention is to provide in a coil handling apparatus, a discharge turnstile having a plurality of spaced arms, means for indexing the arms from a coil receiving position to a coil discharging position, means for releasably locking the arms in the coil discharge position, each of the arms having a plurality of roller members forming a bed for receiving a coil thereon, and means for tilting the bed when the arm thereof is locked in the discharge bed to facilitate removal of a coil from the roller members of the bed.

A still further object of this invention is to provide in a coil handling apparatus for banding coils, a lift-off device disposed adjacent a banding table and having a coil receiving surface formed of a plurality of roller members in alignment with the table, the lift-off device being movable between the coil receiving position and a lower coil discharge position and having opposed shoes disposed to be positioned beneath a coil on the roller members, means for removing the roller members from beneath the coil whereby the coil is supported on the shoes, and means for removing the shoes when the lift-off device in in the coil discharge position to release the coil from the lift-off device.

Other objects of this invention will become apparent from the following description when taken in conjunction with the accompanying drawings in which:

FIGURE 1 is a view in side elevation of coil handling apparatus embodying features of this invention;

FIG. 2 is a top plan view of the coil handling apparatus of FIG. 1;

FIG. 3 is a view in elevation and partly in section and greatly enlarged of a portion of the apparatus of FIGS. 1 and 2;

FIG. 4 is a view in section and greatly enlarged of a portion of the apparatus of FIG. 3;

FIG. 5 is a top plan view with parts removed of a portion of the apparatus of FIG. 3;

FIG. 8 is a view in side elevation and greatly enlarged of a coil lay-down device utilized in the apparatus of FIGS. 1, 2 and 3;

FIG. 9 is a black plan view of the lay-down device of FIG. 8;

FIG. 10 is a view in side elevation and greatly enlarged of an indexing device utilized in the apparatus of FIGS. 1 and 2;

FIG. 11 is a view in section of the carriage utilized in the apparatus of FIG. 10;

FIG. 12 is a view in side elevation illustrating another position for a part of the apparatus of FIG. 10;

FIG. 14 is a view in elevation and greatly enlarged of a coil lift-down device utilized in the apparatus of FIGS. 1 and 2;

FIG. 15 is a side view of the device of FIG. 14;

FIG. 16 is a view in elevation of a portion of the linkage mechanism of the apparatus of FIG. 14 illustrating the shoes thereof in a coil supporting position;

FIG. 17 is another view of the linkage of FIG. 16 positioned with the shoes in a coil release position;

FIGS. 18 and 19 are views in section taken along the lines XVIII—XVIII and XIX—XIX, respectively, of FIG. 14;

Figure 6:
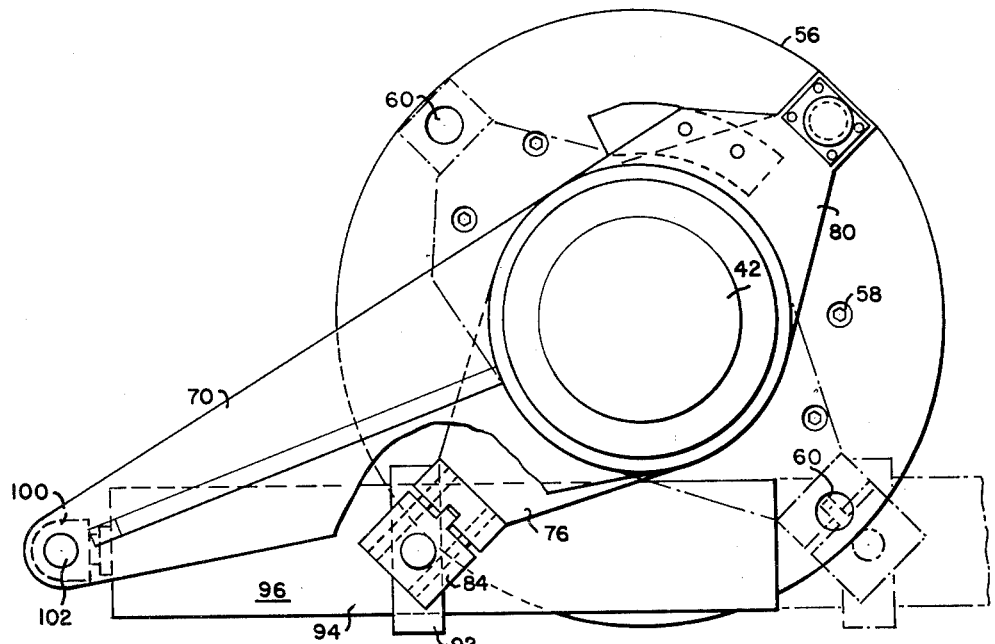
FIG. 6 is a top plan view and greatly enlarged of another portion of the apparatus of FIG. 3.

Referring to the drawings and in particular to FIGS. 1 and 2 thereof, this invention is illustrated by reference to a coil handling apparatus shown generally at 10 comprising a supply station 12, a coil banding and indexing station 14 and a coil discharge station 16.

The supply station 12 comprises a supply turnstile 18 having a plurality of spaced arms 20 disposed to be progressively indexed from a loading or coil receiving position where coils 22 are deposited thereon from a crane (not shown) to a coil discharge position adjacent a lay-down device 24 that is pivotally movable from a vertical coil receiving position to a horizontal coil discharging position.

A banding table 26 (see FIG. 2) of the type disclosed in my Patent No. 2,905,078 dated September 22, 1956, and having a suitable banding machine represented at 28 associated therewith, is shown in alignment with the lay-down device 24 for receiving coils therefrom. The banding table 26 is clearly disclosed in my aforesaid patent and will not be described herein but such description is included by reference to my patent. The banding machine 28 may be of any type suitable for effectively banding a coil positioned on the conical rollers 30 of the banding table 26. The banding station 12 also includes an indexing device 32 for progressively advancing a coil from the lay-down device 24 across the banding table 26 to the coil discharge station 16 as will be described hereinafter.

In this embodiment, the coil discharge station 16 comprises a coil lift-off device shown generally at 34 disposed at one end of the banding table 26 for vertical movement between a coil receiving position in the same plane as that of the banding table to a lower coil discharge position where the coil is deposited onto a coil discharge turnstile 36. The coil discharge turnstile 36 has a plurality of spaced arms 38 each of which carries a coil receiving bed 40 thereon and which are disposed to be progressively indexed from a coil receiving position beneath the coil lift-off device 34 to a coil discharge position.

Referring to FIGS. 3, 4, 5, 6 and 7 the supply turnstile 18 is illustrated in greater detail. Thus the turnstile 18 comprises a fixed central support shaft 42 mounted on and supported by a suitable base member 44. Rotatably mounted about the shaft 42 is the arm carrying sleeve 46 having secured thereto an upper collar 48 and a lower collar 50 which are mounted as by means of bearing supports 52 and 54, respectively, for movement about the shaft 42. A ring flange member 56 is secured to the upper surface of the collar 48 as by spaced screws 58, such ring member 56 having four openings 60 (see FIG. 7) therein spaced 90° apart corresponding to the spacing of the arms 20 as will be referred to hereinafter.

Figure 7:
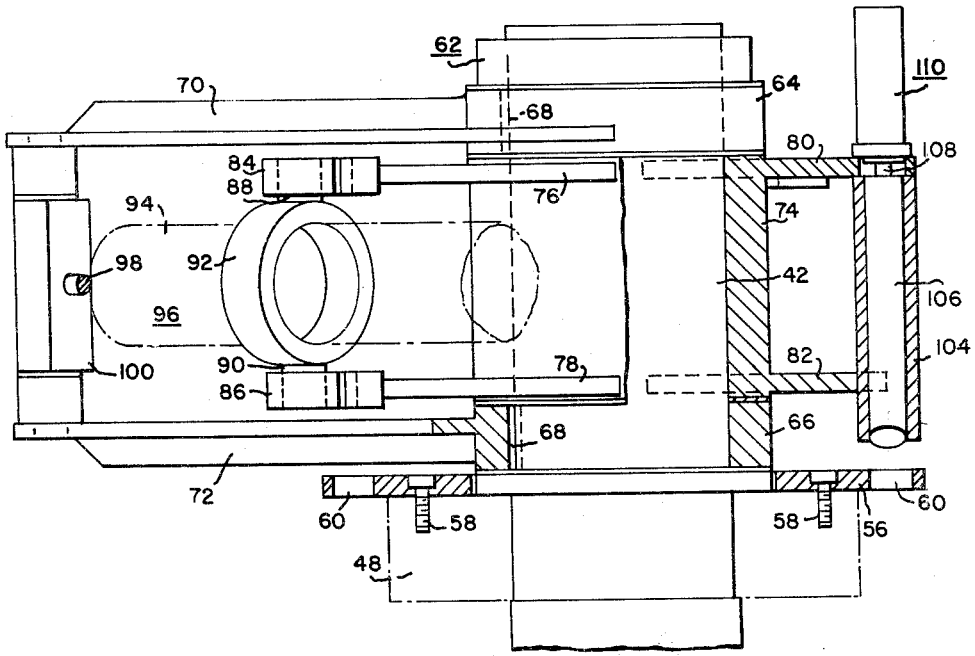
FIG. 7 is a view in side elevation and partly in section and in phantom of the apparatus of FIG. 6.
Figure 13:
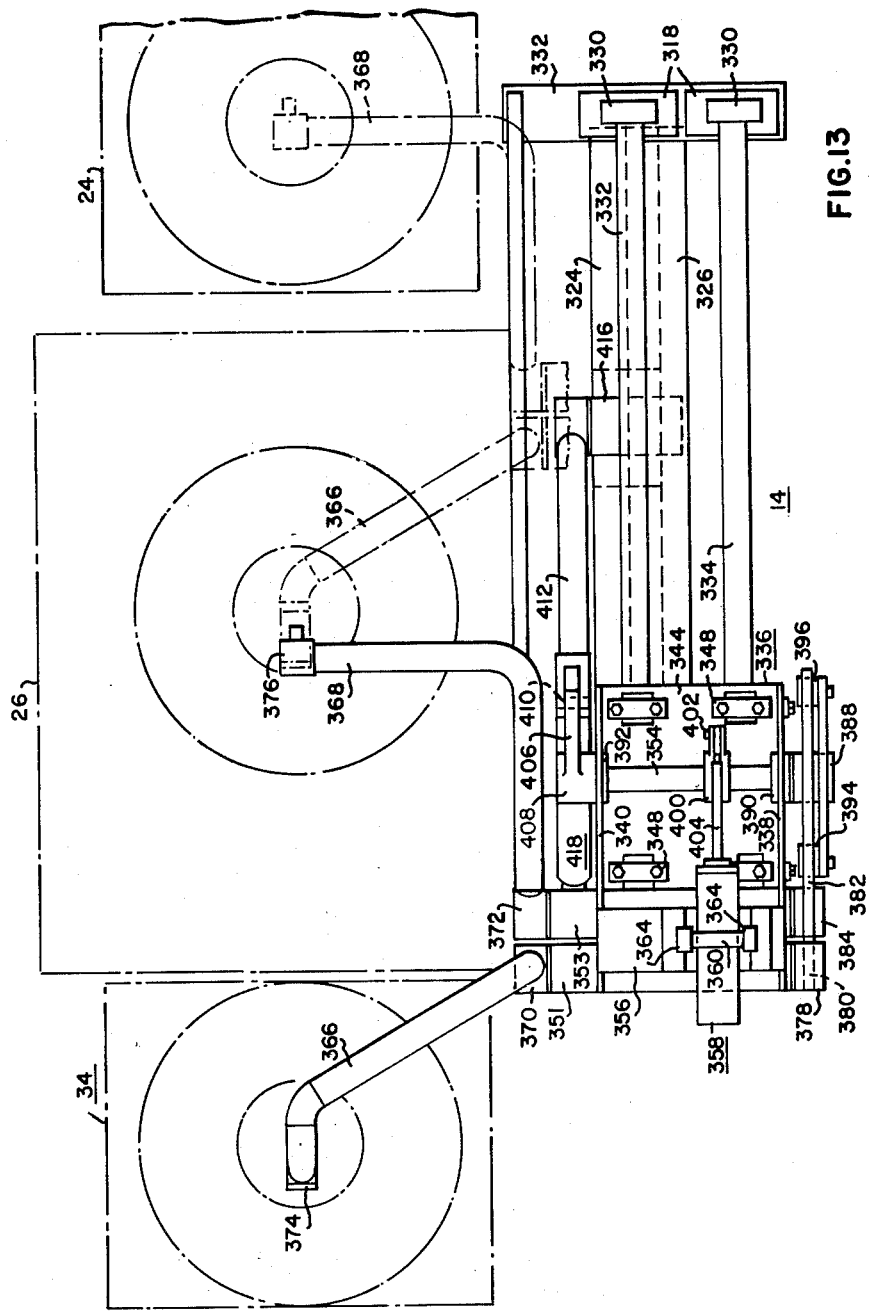
FIG. 13 is a top plan view of the apparatus of FIG. 10 illustrating the operation thereof relative to other parts of the apparatus of FIGS. 1 and 2.

An actuating mechanism 62 for effecting rotation of the sleeve 46 and of the arms 20 carried thereby is disposed above the ring member 56 and is better illustrated in FIGS. 6 and 7. The actuating mechanism 62 comprises two spaced annular members 64 and 66 disposed about the fixed shaft 42 and keyed thereto as at 68, the annular members 64 and 66 having outwardly extending aligned arms 70 and 72, respectively. A movable sleeve member 74 is disposed about the shaft 42 intermediate the annular members 64 and 66 for rotation relative thereto. As illustrated, the sleeve member 74 carries two pairs of spaced outwardly extending arms 76–78 and 80–82 which are disposed 180° apart. The arms 76 and 78 carry a shaft receiving member 84 and 86, respectively, at their outer ends disposed to rotatably receive the shafts 88 and 90, respectively, carried on the outer surface of a ring support 92 in which is fixedly mounted a cylinder 94 of a hydraulic device 96. The piston rod 98 of the device 96 is secured to a clevis member 100 that is mounted for rotatable movement about a shaft 102 that is mounted in and carried between the outer ends of the fixed arms 70 and 72. The other arms 80 and 82 of the rotatable sleeve 74 carry a sleeve 104 in which is mounted a slidable pin 106 that is connected to the piston rod 108 of a hydraulic mechanism 110 carried by the upper arm 80, the pin 106 being a a size and being disposed to be actuated into and out of engagement with one of the openings 60 in the ring 56 under predetermined operating conditions. Thus when it is desired to effect a progressive turning of the arms 20 of the turnstile 18, the pin 106 is actuated downwardly to enter one of the openings 60. The hydraulic device 96 is then operated to effect a movement of the cylinder 94 thereof to apply a turning force to the sleeve 74 as by reason of its pivotal mounting between the ends of arms 76 and 78 to drive the ring member 56 and consequently the sleeve 46 about the shaft 42 through an angle of 90° at which point the hydraulic device 110 is operated to retract the pin 106 and the hydraulic mechanism 96 is activated to return the cylinder 94 and consequently the sleeve 74 and pin 106 to their initial positions where the pin 106 is in alignment with another of the openings 60.

Again referring to FIGS. 3, 4 and 5, each of the arms 20 of the turnstile 18 is formed of an outwardly extending box frame member 112 secured to and carried by the sleeve 46 and the lower collar 50. The upper surface of the member 112 is secured to the sleeve 46 as by means of a reinforcing and supporting flange member 114, the box frame member 112 also having a cross brace 116 secured internally thereof near its outer end. Each of the arm frame box members 112 is also provided with a plurality of spaced bearing support members 118 adjacent the upper surface thereof for rotatably supporting spaced outwardly extending roller members 120 (see FIG. 4) adjacent the outer upper surface thereof for rotatably supporting a coil carrying carriage 122 on each of the arms 20.

Each carriage 122 comprises an upper bed plate 124 disposed to slidably seat on the upper surface of the box frame member 112, the end of the bed plate 124 disposed adjacent the sleeve 46 being slotted as at 126 (see FIG. 5) to receive the fixed reinforcing flange 114 of the arm 20. The bed plate 124 is slightly wider than the upper surface of the member 112 and carries downwardly depending angle members 128 at its outer edges (see FIG. 4) disposed to engage and ride on roller members 120, an inwardly extending strip 130 being secured to the lower edge of each of the angle members 128 and disposed to extend beneath the roller members 120 to maintain the carriage 122 slidably mounted thereon. Depending downwardly from the strips 130 are side plates 132 connected by a bottom plate 134 whereby such side and bottom plates enclose the box frame member 112. The bed plate 124 is provide with and carries an upwardly extending plate member 136 disposed to extend thereacross for receiving coils thereagainst, the plate member 136 being reinforced by two vertically disposed spaced flange members 138 and 140 which are secured between the bed plate 124 and one side of the plate member 136. A protective layer 142 of wood is positioned against the other side of the plate member 136 and spaced wood blocks 144 and 146 are secured in abutting relation thereto on the upper surface of the bed plate 124 disposed to receive and support coils thereon in a vertically disposed position.

In practice, a support member 148 is disposed beneath the arm 20 that is positioned in the coil receiving position. The support member 148 in this instance comprises a roller member 150 rotatably mounted in bearing blocks 152 that are carried on the upper surface of a supporting pillar 154. The arm 20 is thus supported when in the coil receiving position to offset any shock occasioned by the loading of the coils thereon.

In order to effect a movement of the carriage 122 lengthwise of its associated arm 20 when such arm is positioned in a coil discharge position, each carriage is provided with a pair of downwardly depending spaced curved flange members 156 and 158 secured to the lower surface of the bottom plate 134 of the arm enclosure portion of the carriage structure. The pair of spaced curved flange members 156 and 158 are so positioned on the carriage structure and have a predetermined curvature and are so spaced that as one of the arms 20 is moved toward a coil discharge position, the space therebetween is aligned to receive a roller member 160 that is rotatably carried on the end of an arm 162 that is pivotally mounted at its other end as at 163 onto the supporting frame 164 of the turnstile. The arm 162 is pivotally connected as at 165 at an intermediate point to the end of a piston rod 166 of a hydraulic mechanism 168, the other end of the cylinder thereof being pivotally secured as at 169 to a portion of the frame 164. Thus when one of the arms 20 is positioned in a coil discharging position with the roller member 160 disposed between the curved flange members 156 and 158, the hydraulic mechanism 168 is energized a predetermined amount to move the roller member 160 towards the end of the arm 20 thereby applying a predetermined driving force to the carriage 122 to move the carriage a predetermined distance along the arm 20, the purpose of which will be explained more fully hereinafter.

In order to lock the arms 20 in predetermined coil receiving and discharging positions, each of the arms carries a depending substantially V-shaped flange member 170 on the lower surface thereof adjacent its outer end and disposed to receive a roller member 172 therein (see FIG. 5). The roller member 172 extends upwardly from and is rotatably carried on the end of an arm 174 that is pivotally mounted as at 176 on the frame 164. In order to effect movement of the arm 174 to drive the roller member 172 into and out of locking engagement with the flange member 170, a hydraulic mechanism 178 is provided having one end pivotally mounted as at 180 to the frame 164 and the piston rod 182 thereof is pivotally secured as at 184 to a point intermediate the ends of the arm 174.

The coil lay-down device 24 is preferably mounted on the frame 164 of the turnstile 18 being positioned adjacent the end of one of the arms 20 thereof that is in the coil discharge position as illustrated in FIG. 3. In this embodiment, the device 24 comprises two side plate members 186 and 188 (see FIGS. 8 and 9) having a lower angularly extending end portion that is secured adjacent the ends of a sleeve 190 that is rotatably mounted on a shaft 192, the ends of which are carried in suitable bearing blocks 194 and 196 (see FIG. 5) that are mounted on the frame 164. Cross plates 196 and 198 and plates 200 and 202 are secured between and to side plates 186 and 188 to support the same and to provide support bases for certain operating mechanism associated therewith. A plurality of elongated and spaced roller members 204 are also rotatably mounted between the side plates 186 and 188 with the ends of their shafts 206 extending therethrough and with the roller members 204 disposed with a portion of their bodies extending beyond an edge of the plates 186 and 188 a predetermined distance to provide a coil receiving portion or surface for the different operating positions of the device 24.

Adjacent the roller members 204 are a pair of opposed spaced, arcuate, movable shoe or gripper members 208 and 210 which extend outwardly from spaced hub members 212, only one of which is illustrated, each of the hub members being keyed to the ends of supporting drive shafts 214 and 216, respectively. The shafts 214 and 216 are rotatably mounted in spaced sleeves 218 that extend through and are fixedly mounted in supporting plates 200 and 202. The grippers 208 and 210 have a curved shape to fit about the external surface of the outer diameter of a coil when the coil is seated against the roller members 204. Preferably, the grippers are provided with a facing of softer material such as wood or fiber to minimize damage to a coil when in engagement therewith. As will be appreciated, the grippers 208 and 210 may be of many different forms and where desired each may be provided with an outer pivotally mounted shoe member (not shown) which can readily adjust themselves to the contour of the coil.

The actuating mechanism for the grippers 208 and 210 is mounted on the other face of the device 24. Thus hydraulic mechanism 222 (see FIG. 9) has one end of its cylinder 224 pivotally mounted as at 226 onto the cross plate 196 and its piston rod 228 pivotally secured as at 230 to the end of one arm 232 of a three-legged linkage 234 which is pivotally mounted as at 236 in a bearing block 238 carried by the upper portion of the cross plate 198. Another leg 240 of the linkage 234 is pivotally connected at its outer end as at 242 to the end of a rod 244 on which a sliding hub 246 is mounted, the hub 246 being biased to the position shown by a spring member 248 secured between the hub 246 and an end washer 250 about the rod 244 by a nut 252. Pivotally secured to the hub 246 as at 254 is the end of an arm 256 the other end of which terminates in a hub 258 that is keyed to the shaft 216. The third leg 260 of the linkage 234 is pivotally connected as at 262 to a short link 264 that in turn is pivotally connected as at 266 to an end of one leg of a bell crank 268. The bell crank 268 is pivotally mounted as at 270 in a bearing block 272 that is carried by the upper portion of the cross plate 198. The other leg of the bell crank 268 is pivotally connected at 274 to the end of a rod 276 having a hub 278 slidably mounted thereon and biased by a spring 280 mounted between the hub 278 and a washer 282 disposed adjacent the nut 284. The hub 278 is pivotally secured to one end of an arm 286 as at 288, the other end of the arm 286 terminating in a hub 290 that is keyed to the shaft 214. Thus the hydraulic mechanism 222 is connected to be operated to effect a simultaneous gripping or releasing operation of the grippers 208 and 210, it being noted that the spring biased mountings 248 and 280 forming a part of the operating linkage mechanism for the grippers permit some adjustment of the seating of the grippers during a gripping operation.

In order to pivotally move the device 24 from a vertical coil receiving position where the side plates 186 and 188 seat against a support member 292 (see FIG. 3) that is carried on the frame 164 to a horizontally disposed coil discharge position, the sleeve 190 is provided with and carries two spaced depending arms 294 and 296 intermediate the ends thereof, which arms terminate in hubs 298 and 300, respectively, which carry a shaft 302 therebetween. The shaft 302 pivotally carries a connector 304 that is connected to the end of a piston rod 306 of a hydraulic mechanism 308, the other end of which is pivotally mounted as at 310 on the base 44. Thus the hydraulic mechanism 308 is disposed to be operated to effect a pivotal movement of the device 24 about the shaft 192 between the coil receiving and coil discharge positions.

When the device 24 is actuated to its horizontal coil discharge position, the roller members 204 thereof are in a plane in alignment with the spaced rollers 312 which form the supporting and conveying surface of the banding table 26 shown in FIG. 2 with the outer edge of the laydown device 24 being positioned closely adjacent the end of the banding table so that a horizontally disposed coil on the rollers 204 can be readily moved in predetermined steps across the table 26 to the lift-down device 34. In practice, the conical rollers 30 of the banding table 26 are positioned an equal distance between the horizontally disposed coil on the lay-down device 24 and the coil receiving surface, to be later described, of the lift-down device 34.

In order to provide for a step-by-step movement of a coil from the horizontally disposed lay-down device 24 to a banding position on the conical rollers 30 of the banding table 26 and from thence to the lift-down device 34, the indexing device 32 is mounted on a frame 314 positioned adjacent to and extending along the banding table 26. Referring specifically to FIGS. 10, 11, 12 and 13, the frame 314 comprises spaced upright support end members 316 and 318 mounted on suitable footers 320 and 322, respectively, and a lower longitudinal reinforcing support bar 324 and an upper reinforcing support bar 326. The upper ends of the upright end members 316 and 318, two of each being provided at each end of the frame 314, support pillow blocks 328 and 330, respectively, with spaced pipe members 332 and 334 being disposed to extend between and being supported by each of the associated pairs of blocks 328–330. The pipe members 332 and 334 are utilized to provide a pair of supporting rail members for a movable carriage 336 which is disposed to be moved lengthwise relative thereto.

The carriage 336 is formed of two side plates 338 and 340 (see FIGS. 10 and 11) between which and secured therebetween is a lower plate 342 and an upper plate 344 with the side plates projecting upwardly beyond the upper plate 344. In effect the upper and lower plates and those portions of the side plates connected thereby form a substantially rectangularly shaped box that is seated about the spaced pipes 332 and 334, it being noted that adjacent each end of the rectangular box, rollers 346 are positioned through suitable openings in the side plates and upper and lower plates to bear on an adjacent and cooperating pipe member. Each of the rollers 346 is suitably mounted on a plate 348 that is secured to the outer surface of the respective plate members and the rollers 346 are so disposed that six rollers ride on the two pipes at each end of the carriage to maintain the carriage thereon and to provide a strong movable support for the coil engaging portions of the indexing device.

As shown more clearly in phantom in FIG. 10 and in FIG. 12, the portions of the side plates 338 and 340 which extend above the upper plate 344 are disposed to have rotatable shafts 350, 352 and 354 extend therethrough. The shafts 350 and 352 are carried in sleeves 351 and 353, respectively, which are secured in the side plates. Also a cross plate 356 extends across and is secured to the upper edges of side plates 338 and 340 to form a supporting surface for a hydraulic mechanism 358 which is fixedly secured into a ring 360 having opposed studs 362 which extend outwardly therefrom and which are mounted for pivoted movement in bearing blocks 364 mounted in spaced relation on the plate 356. A pair of arms 366 and 368 having hubs 370 and 372, respectively, on one end thereof (see FIG. 13), are disposed with their hubs keyed to an end of the shafts 350 and 352, respectively, to be supported thereby and to be moved about the axis thereof as the shafts are rotated. The arms 366 and 368 extend in opposite directions and have ends 374 and 376, respectively, spaced apart a distance equal to the distance between the inner diameter of a coil positioned on the horizontally disposed lay-down device 24 and the banding position and between the banding position and the coil position on the lift-off device 34, which positions are shown in phantom in FIG. 13. Preferably the ends 374 and 376 are padded so as to minimize damage to the inner diameter of a coil when seated therein as will be described hereinafter. Mounted on the other end of the shaft 350 and keyed thereto is the hub 378 of a downwardly curved arm 380 which is provided with a flat upper roller receiving surface. A similar arm 382 but curved upwardly has its hub 384 keyed to the other end of the shaft 352, the arm 382 being provided with a flat lower roller receiving surface.

In order to raise and lower the arms 366 and 368 to control the engagement of their ends with the inner diameter of a coil, a link 386 having a centrally disposed hub 388 is keyed onto an end of the shaft 354 which is mounted to extend through bearings 390 and 392 mounted in the side plates 338 and 340, respectively. The link 386 carries roller members 394 and 396 at the opposite ends thereof, it being noted that such link is disposed with its rollers in rolling engagement with the flat surfaces of arms 380 and 382, respectively. A link 398 has its hub 400 keyed to the shaft 354 intermediate the side plates 338 and 340 and in alignment with the hydraulic mechanism 358 whereby the end of the link 398 is pivotally secured as at 402 to the end of the piston rod 404 thereof. When the hydraulic mechanism 358 is operated to apply a pull to the link 398 the shaft 354 is turned counterclockwise to turn the link 386 whereby the roller members 394 and 396 carried thereby ride on the arms 380 and 382 to drive the shaft 350 in a clockwise direction and the shaft 352 in a counterclockwise direction to simultaneously raise the arms 366 and 368 from the position shown in FIG. 10 to the position shown in FIG. 12, it being noted that as such movement is effected, the hydraulic mechanism 358 pivots in its mounting to permit the required movement of the link 398.

A link 406 having a hub 408 is also rotatably mounted on the other end of the shaft 354 and is disposed to be rotated independently of the rotation of such shaft. The end of the link 406 is pivotally connected at 410 to the upper end of a drive rod 412 the lower end of which is pivotally mounted on a shaft 414 carried in a bearing block 416 that is secured to the upper surface of the lower support bar 324 of the frame 314. In order to drive the drive bar 412, a hydraulic mechanism 418 having one end thereof pivotally secured at 420 to a block 422 carried on the frame 314 is disposed with the end of its piston rod 424 pivotally connected at 426 to a flange member 428 that is carried by the drive bar 412. When the hydraulic mechanism 418 is operated to drive out its piston rod 424, the drive arm 412 is rotated about its mounting to apply a pull to the link 406 which in turn applies a pull to the carriage 336 to move the carriage lengthwise of the pipes 332 and 334 relative to the banding table 26 and from the position shown in full lines in FIG. 10 to the position shown in phantom thereon. As will be apparent from FIG. 13, the carriage 336 and consequently the arms 366 and 368 can be readily moved between the three coil positions on the horizontally disposed lay-down device 24, the banding position on the banding table 26 and the coil receiving position on the lift-down device 34.

As illustrated in FIGS. 1 and 2 the coil lift-down device 34 is fixedly mounted on an arm 430 that is fixedly mounted on the upper end of the discharge turnstile 36 so as to be in a position in alignment with the banding table 26. The arm 430 (see FIGS. 14 and 15) terminates in a fixed header 432 through which guide rods 434 and 436 are slidably mounted, the guide rods being secured at their lower ends to the upper surface of a cross bar 438 that is disposed to be raised and lowered. A hydraulic mechanism 440 is also mounted on the upper surface of the header 432 and is disposed with its piston rod 442 extending through the header and connected as at 444 to and centrally of the upper surface of the cross bar 438 to control the vertical movement thereof as will be referred to hereinafter.

Disposed on opposite sides of the header 432 are curved arms 446 and 448, it being noted that there are two of each disposed in spaced relation on the respective sides of the header. Such arms have their hubs 450 and 452, respectively, mounted on shafts 454 and 456, respectively, being keyed thereto for rotation therewith. The shafts 450 and 452 are each rotatably mounted in similar bearing blocks 458 secured to the opposite sides of the header 432. Each of the hubs 450 also carries an arm 460 which extends outwardly across a face of the header 432 towards and in the same plane as another arm 462 that is carried by each of the hubs 452 of the arms 448, the ends of each pair of the arms 460 and 462 adjacent the opposite faces of the header 432 being pivotally connected to the ends of a connecting link 464. One of the pair of hubs 450 also carries an upwardly extending arm 466 the outer end of which is pivotally connected at 468 to the end of the piston rod 470 of a hydraulic mechanism 472 having oppositely extending pins 473 thereon that are pivotally mounted (see FIG. 15) in upright supports 474 and 476 that are carried on the header 432 and the arm 430. A reinforcing cross bar 478 and 480 are secured across the aligned pairs of arms 446 and 448, respectively, to reinforce the assembled arms on the header 432. The lower end of each of the pairs of arms 446 and 448 curve inwardly towards the opposite pairs and have mounted thereon frame members 482 and 484 for receiving a coil from the banding table 26. Thus each of the arms 446 and 448 terminates in a frame member 482 and 484 in which are rotatably mounted spaced roller members 486 and 488, respectively, having a surface thereof disposed slightly above their supporting frame members. The roller members 486 and 488 are spring biased on, and lengthwise with respect to, their mounting shafts 483 and 485, respectively, as by means of springs 487 and 489, respectively. The arms 446 and 448 are of a length so that when the roller members 486 and 488 carried thereby are in the position shown in full lines in FIG. 14, the upper surface of the roller members are in alignment with and in the same plane as that of the roller members 312 of the banding table 26 to receive a coil therefrom.

The cross bar 438 referred to hereinbefore is disposed to carry a linkage and operating mechanism between the spaced pairs of arms 446 and 448 to move a pair of opposed support lugs or footers 490 and 492 into supporting position beneath a coil carried on the spring biased roller members 486 and 488. The cross bar 438 is formed with forked ends to form spaced flanges 494 and 496 (see FIG. 18) through which is mounted shafts 498 and 500, respectively. Links 502 and 504 have their hubs mounted on shafts 498 and 500, respectively, being keyed thereto and each being formed with bifurcated ends or spaced arms having hubs thereon through which are mounted shafts 506 and 508, respectively, and on which are pivotally mounted downwardly depending links 510 and 512, respectively. The links 510 and 512 terminate in bifurcated arms having hubs through which are mounted shafts 514 and 516, respectively (see FIGS. 14, 16, 17 and 18). The link 502, however, differs from the link 504 in that link 502 is formed to also have a pair of downwardly depending arms 518 (see FIGS. 14 and 17) so that the link 502 in effect is in the form of a bell crank. The lower ends of the arms 518 terminate in hubs in which a shaft 520 is pivotally mounted, the shaft 520 being pivotally connected to the end of a piston rod 522 of a hydraulic device 524, the other end of which is pivotally mounted at 526 between a pair of spaced downwardly depending flanges 528 that are secured to the lower surface of the cross bar 438.

Also rotatably mounted on the shaft 498 adjacent the opposite sides of the cross bar 438 are a pair of links 530 which extend downwardly and which terminate in hubs through which a shaft 532 is rotatably mounted, it being noted that in FIG. 17 such links 530 are omitted in order to better illustrate the lower arm 518 of the bell crank 502. The shaft 498 also carries a pair of spaced upwardly extending links 534 keyed thereto at the outer ends of the shaft, the links 534 terminating in hubs for receiving connecting pins 536 therein on which is rotatably mounted one end of a connecting link 538. One end of another connecting link 540 is also carried by a connecting pin 542 that is rotatably mounted on the link 530 intermediate the ends thereof.

Depending downwardly from and rotatably mounted on the shaft 532 are a pair of spaced L-shaped links 544, the lower ends of which terminate in hubs through which a shaft 546 is rotatably mounted for receiving and rotatably supporting a substantially L-shaped carrier 548 for the footer 490. The outer end of the upper arm of the carrier 548 is rotatably connected between the ends of a pair of links 550 by a pin 552 with the upper ends of the links being rotatably mounted on the shaft 514. A link 553 has its ends rotatably mounted on shafts 514 and 532. The outer ends of links 544 are also pivotally connected by pins 554 to the lower ends of links 556, the upper ends of which are rotatably mounted on the ends of a shaft 558 which is rotatably mounted to extend through the cross bar 438.

The shaft 500 at the other end of the cross bar 438 also has a pair of links 560 keyed thereto adjacent the opposite sides of the end of the cross bar and intermediate the ends of such links. The lower end of each of links 560 terminates in a hub which is rotatably connected by a shaft 562 to a substantially L-shaped link 564, the links 564 being maintained in spaced relation by the hub of a link 566 that is rotatably mounted on and extends between shafts 562 and 516. The lower ends of the spaced links 564 terminate in hubs through which pin 568 is rotatably mounted for receiving and supporting a substantially L-shaped carrier 570 for the footer 492. The outer end of the upper arm of the carrier 570 is rotatably connected between the lower ends of spaced links 572 by a pin 574 and the upper ends of links 572 are rotatably mounted on shaft 516. The outer ends of the upper arms of the links 564 are also pivotally connected by shafts 576 to the lower ends of links 578, the upper ends of which are rotatably carried on the ends of a shaft 580 which extends through the cross bar 438. To complete the cross connection between the linkage for the footers 490 and 492, the upper end of links 560 are rotatably connected by pin 582 to the other end of the connecting link 540. Spaced arms 584 are also keyed to the shaft 500 and have their outer ends rotatably connected by shafts 586 to the other ends of the connecting links 538. Another hydraulic device 588 is also pivotally carried by a pin 590 on the flanges 528 and is disposed with its piston rod 592 connected to a sleeve 594 that is pivotally carried on a shaft 596 that extends between links 560 intermediate the ends thereof.

In practice the footers 490 and 492 and the linkage just described are maintained in the position illustrated in FIG. 17 when a coil is loaded onto the rollers 486 and 488 of the lift-off device 34. Thereafter hydraulic device 524 is operated to apply a force to arm 518 to move it and shaft 498 and links 502 and 534 keyed thereto counter-clockwise to drive links 510, 550 and 553 downwardly about shaft 532 as a pivot point to force the carrier 548 to pivot in a counterclockwise direction about pin 546 while at the same time link 534 applies a pull to connecting link 538 to rotate links 584, shaft 500 and link 504 in a clockwise direction to drive links 512, 572 and 566 downwardly about shaft 562 as a pivot point to force the carrier 570 to rotate in a clockwise direction about pin 568 to thereby simultaneously move the footers 490 and 492 into a horizontal position as shown in FIGS. 14 and 16. The hydraulic device 588 is then operated to apply a pull to links 560 to rotate them in a clockwise direction about the shaft 500 so that the lower end of links 560 drives the links 564 inwardly from a position such as is illustrated in FIG. 14 to a position where the side of the lower leg of links 564 abuts against the coil. At the same time the upper portion of link 560 applies a pull to connecting link 540 to rotate link 530 about shaft 498 in a clockwise direction to move the links 544 into abutting relation with the other side of the coil in which position the footers 490 and 492 are positioned immediately beneath the coil. It is to be noted that if for any reason the coil carried on the roller members 486 and 488 is not perfectly centered with respect to links 544 and 564, that as one or the other of such links first contacts a side of the coil sufficient pressure is applied thereto to effectively move the spring biased roller members 486 and 488 and the coil carried thereon lengthwise of the shafts therefor to center the coil with respect to links 544 and 564.

With the footers 490 and 492 in a coil supporting position, the hydraulic mechanism 472 is operated to move the arms 446 and 448 outwardly from the full line position shown in FIG. 14 to the dash-dot line position to thereby remove the frame members 482 and 484 and roller members 486 and 488 carried thereby from beneath the coil and permit the coil to seat on the footer lugs 490 and 492. The hydraulic mechanism 440 is then operated to lower the cross bar 438 and linkage carried thereby and consequently the coil carried on the footer lugs 490 and 492 from a coil receiving position adjacent the end of the banding table 26 to a predetermined lower coil discharging position. In this position, hydraulic device 524 is operated to drive links 518, 502 and 534 in a clockwise direction and simultaneously therewith by reason of the connecting link 538 drive the links 584 and 504 in a counterclockwise direction to simultaneously lift the connected links 510–550 and 512–572, respectively, about shafts 532 and 562, respectively, to pivot the carriers 548 and 570, respectively, about pins 546 and 568, respectively, to simultaneously move the footer lugs 490 and 492 from beneath the coil and discharge it from the lift-off device 34. The hydraulic mechanism 440 is then operated to raise the cross bar 438 and linkage carried thereby to the coil receiving position where hydraulic device 588 is operated to open the linkage to a position such as is shown in FIG. 17 and the hydraulic mechanism 472 is operated to return the arms 446 and 448 to the position shown in full line in FIG. 14 where the surfaces of the roller members 486 and 488 are in a plane in alignment with the surfaces of the roller members 312 of the banding table 26 for receiving another coil therefrom.

Figure 20:
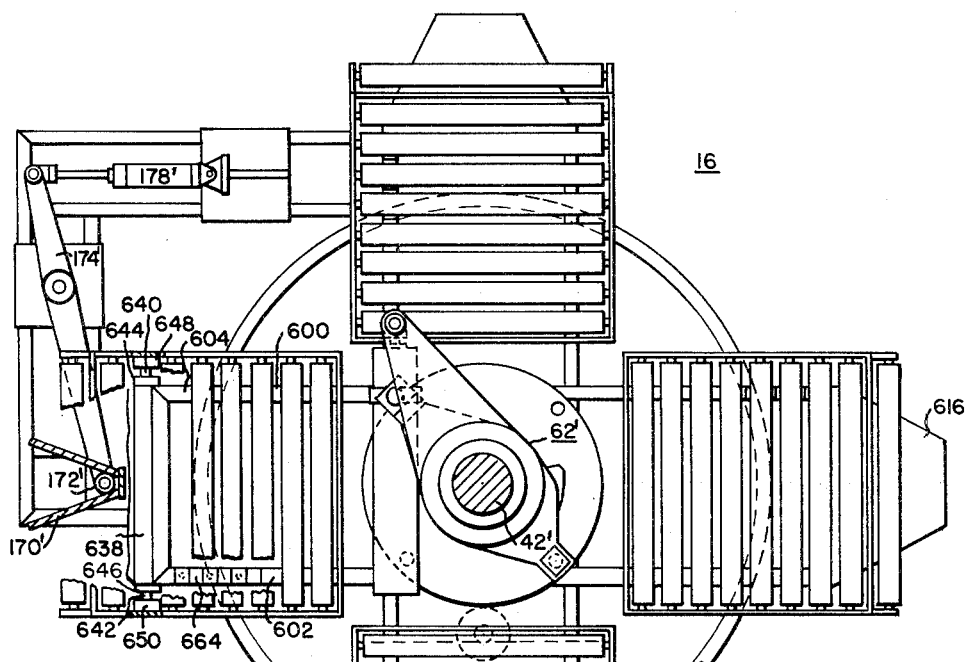
FIG. 20 is a top plan view of a discharge turnstile forming a part of the apparatus of FIGS. 1 and 2.
Figure 21:
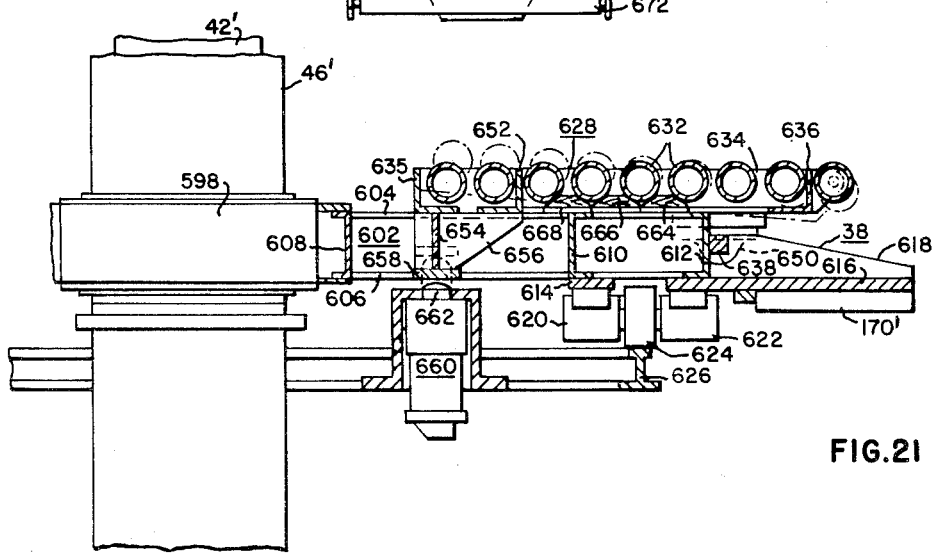
FIG. 21 is a view in side elevation and partly in section of a portion of the turnstile of FIG. 20.

The discharge turnstile 36 is somewhat similar to the supply turnstile 18 previously described, in that the actuating mechanism 62' for driving the sleeve 46' which carries spaced arms 38 about the shaft 42' is the same as that of the actuating mechanism 62 shown in FIGS. 3, 6 and 7 and described with reference to the supply turnstile 18 and therefore need not be again shown as specifically applied to the discharge turnstile 36. The construction of the arms 38 and related apparatus for the turnstile 36 does, however, differ from that shown and described for turnstile 18 and will therefore be specifically described in connection with the showing made thereof in FIGS. 20 and 21.

In the embodiment of the turnstile 36, each of the arms 38 are carried by a ring 598 that is welded or otherwise secured to the sleeve 46' to be rotated by the actuating mechanism 62' about the vertical shaft 42'. The arms 38 are preferably mounted 90° apart to provide four stations for receiving coils as the turnstile is indexed through a loading position. Each arm comprises two spaced side bars 600 and 602 which extend outwardly from and are secured to the ring 598, each of the bars 600 and 602 being provided with upper and lower inwardly turned supporting flanges 604 and 606, respectively, and between which are secured spaced, reinforcing channel members 608, 610 and 612. A reinforcing cross plate 614 is secured beneath the spaced side bars 600 and 602 and the channel member 610 being welded thereto. An elongated extension plate 616 having a somewhat tapered end is also disposed beneath the side bars 600 and 602 and the channel member 612 to extend thereacross and is secured thereto as by welding to constitute the outer extremity of the arm 38 and to form a support for a depending substantially V-shaped flange member 170' of the type described with reference to the turnstile 18. A reinforcing vertically disposed flange member 618 is centrally disposed of and secured between the upper surface of the plate 616 and the side of the channel member 612. In order to support each of the arms 38, pillow blocks 620 and 622 are mounted on the lower surfaces of the plates 614 and 616, respectively, and a roller 624 is rotatably mounted therebetween to ride on a circular rail 626 disposed about the base of the turnstile 36.

Each of the arms 38 is provided with a coil receiving bed 628 formed of a rectangular frame 630 and having spaced roller members 632 extending between and rotatably mounted in the sides 634 of the frame 630 between the end angle members 635 and 636 thereof, with the upper surfaces of the rollers 632 disposed slightly above the frame 630. It is noted that the sides 634 extend beyond the end cross angle member 635 of the frame and are tapered upwardly and that such extensions form the support for another roller member 632 at the very end of the frame 630. The bed 628 is preferably rotatably mounted on the arm 38 so that the bed may be tilted when the arm 38 is in a coil discharge position as will be referred to hereinafter. For this purpose, a reinforcing bar 638 and which is provided with shaft ends 640 and 642, is disposed to extend across the outer face of the channel member 612 and through flange members 644 and 646 welded thereto and to the ends of the sides 600 and 602 of the arm 38 with the shaft ends 640 and 642 being seated in bearing blocks 648 and 650, respectively, that are secured to and extend inwardly from the lower surface of the sides of the bed frame 630.

In order to effect the tilting of the bed frame 630 from its seated position on the arm 38, a cross bar 652 formed of an angle member is secured to and between the sides 634 of the frame 630 and depending flanges 654 and 656 are welded across a portion of the lower surfaces of the end cross angle member 635 and the cross bar 652 to extend downwardly between the sides 600 and 602 of the arm 38 and terminate in a base plate 658. A hydraulic device 660 is disposed beneath the base plate 658 and is provided with a curved pusher plate 662 carried on the end of its piston rod (not shown) that is disposed to seat against the plate 658 when the device 660 is operated to drive its piston rod to apply a force thereto for effecting the tilting of the bed 628 about the pivot shafts 640 and 642.

As will be appreciated there may be a tendency for the coils carried on the bed 628 to move thereon. In order to prevent such tendency except when the bed 628 is tilted, brake pads 664 are mounted on the upper surfaces of one or both of the side bars 600 and 602 of the arm 38 in a position to engage certain of the roller members 632 of the bed 628 that are intermediate the ends of the bed 628 when the bed 628 is supported in a horizontal non-tilted position on the bed. The brake pads 664 may have different forms and in the embodiment illustrated in FIG. 21 comprise wood blocks 666 having beveled surfaces which are preferably covered with felt and which are mounted on a base strip 668 that is secured lengthwise of the upper flange 604 of the side bar 602, the wood blocks 666 being disposed to extend upwardly between adjacent roller members 632 to frictionally engage the same when the bed 628 is in a non-tilted position but to be out of engagement therewith when the bed 628 is tilted.

As in the case of the turnstile 18, the turnstile 36 is also provided with a locking mechanism (see FIG. 20) comprising, a rotatable roller member 172' extending upwardly from an arm 174' and disposed to be actuated into and out of engagement with the flange members 170' in response to the operation of a hydraulic mechanism 178', to effectively lock the turnstile 36 with its arms 38 in predetermined loading and unloading positions. In practice one of the arms 38 is positioned in a loading or coil receiving position immediately beneath the lift-down device 34 and closely adjacent to the lowest position of the footer lugs 490 and 492 to receive a coil therefrom when the footer lugs are actuated to their coil releasing position.

Where desired, another conveyor 670 formed of a plurality of spaced coil receiving roller members 672 (only one of which is shown) is disposed with its end adjacent to and in alignment with one of the arms 38 when such arm is in its coil discharging position. The conveyor 670 is positioned with its roller members 672 in a plane slightly lower than that of the roller members 632 of the horizontally disposed bed 628 so that when the bed 628 is tilted as previously described to a position such as is illustrated in phantom in FIG. 21, a coil may readily move therefrom to the conveyor 670.

In operation, the apparatus previously described is integrated and disposed to be automatically controlled from the time a supply of coils 22 is loaded onto the turnstile 18 and a loaded arm 20 thereof is in a coil discharge position through the different operations performed on the coil until the coil is discharged from the turnstile 36. Thus suitable limit switches (not shown) are positioned throughout the coil handling apparatus 10 to sequentially control the operation of the different hydraulic mechanisms described to insure the sequential and step-by-step operation thereof to effect the step-by-step cooperation of the different portions of the overall apparatus to effect a programmed movement of the coils from the loading to the unloading of the apparatus. The control system is not illustrated as it is believed to be unnecessary in describing the operation of the apparatus.

In practice, with the coil handling apparatus in the position illustrated in FIGS. 1 and 2, a supply of slit wound coils 22 is loaded on the carriage 122 on the arm 20 of the turnstile 18. The hydraulic device 110 is then operated to position the pin 106 into the opening 60 in the ring 56, after which the hydraulic device 178 is operated to retract the roller member 172 from its locking position in the flange 170 and the hydraulic mechanism 96 is operated to effect a turning of the turnstile 18 to position another arm 20 thereof in the loading position. At this point, hydraulic device 110 is operated to retract the pin 106 and the hydraulic device 178 is operated to lock the turnstile 18 while the hydraulic device 96 is operated to return the sleeve 104 and pin 106 carried therein to their initial position. This sequence is repeated until a loaded arm 20 is in the coil discharge position adjacent the vertically disposed lay-down device 24.

Hydraulic device 168 is then operated to move the carriage 122 forward to seat the external vertically disposed coil 22 thereon against the roller members 204 and hydraulic device 222 is operated to drive the grippers 208 and 210 into gripping engagement with the outer surface of the external vertical coil 22. Hydraulic device 308 is then operated to move the coil lay-down device 24 from its vertical position to a horizontal position to carry the gripped coil thereon to a horizontal discharge position in alignment with the banding table 26. When thus positioned, hydraulic device 222 is operated to cause the grippers 208 and 210 to move away from the coil.

Hydraulic device 418 is then operated to move the indexing carriage 336 lengthwise of the pipes 332 and 334 to a position where the arm 368 is positioned with its coil engaging end 376 over the opening of the inner diameter of the horizontally disposed coil on the roller members 204 of the lay-down device 24. Hydraulic device 358 is then operated to move the arms 366 and 368 of the indexer downwardly to move the end 376 into the confines of the inner diameter of the coil on the lay-down device 24, after which the hydraulic device 418 is again operated to move the carriage 336 and the arms 366 and 368 forward along the table 26 so that the end 376 engages the coil and advances it from the lay-down device 24 to a banding position over the conical rollers 30 of the banding table 26. At this point the carriage 336 is stopped and the hydraulic device 358 is operated to lift the arms 366 and 368 upwards and device 418 is operated to move the carriage 336 towards the lay-down device. The banding machine 28 is then operated to effect the banding of the coil in a number of positions, the coil being turned on the conical rollers 30 as described in Patent No. 2,905,078 referred to hereinbefore.

As soon as the coil is moved from the lay-down device 24, hydraulic device 308 is operated to return the lay-down device 24 to its vertical position and the carriage 122 is indexed forward as described to seat the next external coil carried thereon against the roller members 204 thereof after which the grippers 208 and 210 are again operated to grip such coil and the lay-down device 24 is again returned to its horizontal position and the grippers 208 and 210 are moved away from the coil. The banding operation is completed by this time and movement of the carriage 336 with the arms 366 and 368 in the raised position is continued to return it to the position adjacent the coil lay-down device 24 where the arms 366 and 368 are moved to seat their ends 374 and 376, respectively, within the inner diameters of the banded coil seated on the conical rollers 30 and the unbanded coil on the lay-down device. The carriage 336 is again moved forward to cause the arms 366 and 368 to simultaneously drive the banded coil from the banding position to a position on the roller members 484 and 486 of the coil lift-down device 34 and the unbanded coil from the lay-down device 24 to the banding position.

Immediately the hydraulic device 358 is again operated to raise the arms 366 and 368 and the device 418 is operated to move the carriage 336 towards the lay-down device 24 to insure that the arms 366 and 368 will not interfere with the operation of the lift-down device 24 and with the banding operation of the next succeeding coil. In the meantime, the operations previously described with respect to advancing the next succeeding external coil carried on the carriage 122 and the operations of the lay-down device 24 to move such coil to a horizontal position on the horizontally disposed lay-down device 24 are being repeated so that upon completion of the banding operation on a coil in the banding position and the movement of the carriage 336 towards the lay-down device 24, the lay-down device with a coil thereon will be in the horizontal position and ready to receive the ends of the arms 366 and 368 within the inner diameters of the banded and next succeeding unbanded coils, respectively.

As soon as the arm 366 is moved from the coil lift-off device 34, hydraulic device 524 carried thereby is operated to move the linkage mechanism controlled thereby to move the footer lugs 490 and 492 from a position as shown in FIG. 17 to the horizontal position as shown in FIG. 14, after which hydraulic device 588 is operated to move the links 544 and 564 to abutting relation with the opposite sides of the coil carried on the roller members 486 and 488 and the footer lugs 490 and 492 into a coil supporting position beneath the coil carried on the roller members 486 and 488. Hydraulic device 472 is then operated to retract the roller members 486 and 488 from their coil supporting position and to permit the coil carried thereby to be deposited on the lugs 490 and 492.

The hydraulic device 440 is then operated to lower the cross bar 438 and linkage and operating mechanism carried thereby to lower the banded coil on the lugs 490 and 492 to a position immediately above and closely adjacent the roller members 632 of the bed 628 carried on the arm 38 of the turnstile 36 that is in the coil receiving position or closely adjacent another banded coil that may have previously been deposited thereon. Hydraulic device 524 on the cross bar 438 is then again operated to quickly retract the lugs 490 and 492 from beneath the banded coil and deposit such coil on the arm 38. Hydraulic device 588 is then operated to move the linkage controlled thereby to move the links 544 and 564 to their spread position. Hydraulic device 440 is also operated to return the cross bar 438 and linkage carried thereby to its upper position after which hydraulic device 472 is again operated to return the roller members 486 and 488 to a coil receiving position in alignment with the banding table 26 for receiving another banded coil therefrom as the coils are advanced thereacross as previously described. Usually limit switches (not shown) are disposed to be operated to control the operation of the different hydraulic devices so as to prevent a downward movement of the cross bar 438 until the arm 366 is removed from the lift-down device 24, to prevent a removal of the roller members 486 and 488 from beneath a banded coil thereon until the lugs 490 and 492 are positioned to support such coil, and to prevent the operation of the carriage 336 forward to move another banded coil onto the lift-down device 34 until the rollers 486 and 488 are again in a coil receiving position. The disposition of such limit switches and the circuits controlled thereby to control the operation of the different hydraulic devices is well within the skill of the normal electrician and will not be further referred to herein.

After one or more banded coils have been deposited onto the bed 628 of one of the arms 38 of turnstile 36, the hydraulic device 178' is operated to unlock the arms of the turnstile and the operating mechanism 62' is operated as previously described with respect to the turnstile 18 to index the arms 38 progressively through the different positions from a loading to a discharging position, the arms being locked in each position while coils are being loaded or unloaded therefrom. When a loaded arm is indexed to the discharge position, the hydraulic device 660 is operated to tilt the bed 628 to a position away from the brake pads 664 where the roller members 632 are free to rotate and the banded coil thereon is moved by gravity onto the conveyor 670.

During the operation of the coil handling apparatus as previously described, it will be appreciated that the turnstile 18 is operated so that when the coils on the carriage 122 on the arm 20 in the coil discharge position are removed therefrom, hydraulic device 168 is operated to retract the carriage from the coil lay-down device 24 to a loading poistion on the arm and the sequence of operations, previously described, are repeated to index another loaded arm into the coil discharge position so that a steady supply of unbanded coils is available for a banding operation. It will be apparent that as the coils are progressively removed by the lay-down device 24, other coils are being loaded onto the arm that is locked in the loading position.

In practice, limit switches (not shown) are also disposed to control the operation of the different hydraulic devices to prevent an indexing movement of the turnstile 18 until the carriage 122 on the arm in the coil discharge position is retracted thereon from the coil lay-down device, to prevent a forward movement of the carriage 122 until the coil lay-down device is in a vertical position, to prevent the movement of the coil lay-down device to the vertical position until its grippers 208 and 210 are in the open position, and to prevent the index device 32 from being operated to advance the arm 368 thereof to engage a coil on the coil lay-down device 24 until the lay-down device 24 is in the horizontal coil discharge position and the grippers 208 and 210 are released from the coil thereon.

The coil handling apparatus of this invention provides for an efficient mechanical movement of coils through a banding operation in definite step-by-step movements so correlated as to minimize space, time and man-power requirements. As will be apparent from the teachings contained herein, anyone skilled in the art can readily reproduce the coil handling apparatus as it is in general formed of standard components or components that can be readily fabricated.

I claim:

1. A coil handling apparatus comprising, in combination, a loading turnstile having a plurality of spaced outwardly extending arms thereon, a carriage disposed on each of said arms for receiving a plurality of vertically disposed coils thereon, means for progressively indexing said arms from a loading position to a coil discharging position, a coil lay-down device disposed to be pivotally moved from a vertical position adjacent said coil discharging position of said loading turnstile to a horizontal coil discharging position, means carried by said lay-down device disposed to be operated to grip the external coil carried on said carriage when the lay-down device is in said vertical position and to release said coil when the lay-down device is in its horizontal coil discharging position, means disposed to be actuated to move said carriage forward after a coil is removed therefrom to advance the next external coil carried thereby to a position to be gripped by said gripping means of said lay-down device, a banding table disposed with a coil receiving surface thereon having one end disposed to receive a coil from said horizontally disposed lay-down device, a lift-off device disposed to receive a coil at the other end of said table, a banding machine disposed adjacent said table and intermediate said horizontally disposed lay-down device and said lift-off device for operation to band a coil in a position substantially equidistant from said lay-down device and said lift-off device, second indexing means disposed for operation to engage and progressively move a coil from said lay-down device to said banding position and from thence to said lift-off device in two distinct substantially equal steps, means for removing said second indexing means from engagement with the coil at each of said banding position and said lift-off device, said second indexing means being effective to simultaneously move a coil from said banding position to said lift-off device and a coil from said lay-down device to said banding position, a discharge turnstile having a plurality of spaced coil receiving beds extending outwardly therefrom and disposed to be progressively indexed from a coil receiving position beneath said lift-off device to a coil discharge position, means disposed to actuate said lift-off device to lower a coil thereon and deposit the coil on one of said coil receiving beds in said coil receiving position, and releasable means disposed to be operated to lock said discharge turnstile to maintain the beds thereof in said positions.

2. A coil handling apparatus comprising, in combination, a loading turnstile having a plurality of spaced outwardly extending arms thereon, a movable carriage disposed on each of said arms for receiving a plurality of vertically disposed coils thereon, means for progressively indexing said arms from a loading position to a coil discharging position, a coil carrying lay-down device disposed to be pivotally moved from a vertical position adjacent said coil discharging position of said loading turnstile to a horizontal coil discharging position, means carried by said lay-down device disposed to be operated to grip the external vertically disposed coil carried on said carriage when the lay-down device is in said vertical position and to release said coil when the lay-down device and coil carried thereby are in the horizontal coil discharging position, actuating means disposed to engage said carriage when the arm therefor is in only the discharge position and disposed to be operated to move said carriage forward after a coil is removed therefrom to advance the next vertically disposed external coil carried thereby to a position to be gripped by said gripping means of said lay-down device, a banding table disposed with a coil receiving surface thereon having one end disposed to receive a coil from said horizontally disposed lay-down device, a lift-off device disposed to receive a coil at the other end of said table, means for actuating said lift-off device between said coil receiving position and a lower coil discharge position, a banding machine disposed adjacent said table and intermediate said horizontally disposed lay-down device and said lift-off device for operation to band a coil supported on said table in a position substantially equidistant from said lay-down device and said lift-off device, second indexing means disposed for operation to engage and progressively move a coil from said lay-down device to said banding position and from thence to said lift-off device in two distinct substantially equal steps, means for removing said second indexing means from engagement with the coil at each of said banding position and said lift-off device and for moving said second indexing means to predetermined positions to engage a coil at each of said banding position and on said horizontally disposed coil lay-down device, said second indexing means being effective to simultaneously move a coil from said banding position to said lift-off device and a coil from said lay-down device to said banding position, a discharge turnstile having a plurality of spaced coil receiving beds extending outwardly therefrom and disposed to be progressively indexed from a coil receiving position beneath said lift-off device to a coil discharge position, means carried by said lift-off device and disposed to be actuated when said lift-off device is in its coil discharge position to deposit the coil carried thereby onto said coil receiving bed in said coil receiving position, and releasable means disposed to be actuated to lock said discharge turnstile to maintain the beds thereof in said progressive positions during a loading or discharge operation.

3. A coil handling apparatus comprising, in combination, a loading turnstile having a plurality of spaced outwardly extending arms thereon, a movable carriage disposed on each of said arms for receiving a plurality of vertically disposed coils thereon, means for progressively indexing said arms from a loading position to a coil discharging position, a coil carrying lay-down device disposed to be pivotally moved from a vertical position adjacent said coil discharging position of said loading turnstile to a horizontal coil discharging position, means carried by said lay-down device disposed to be operated to grip the external vertically disposed coil carried on said carriage when the lay-down device is in said vertical position and to release said coil when the lay-down device and coil carried thereby are in the horizontal coil discharging position, means disposed to be actuated to move said carriage forward after a coil is removed therefrom to advance the next external vertically disposed coil carried thereby to a position to be gripped by said gripping means of said lay-down device, a banding table disposed with a coil receiving surface thereon having one end disposed in alignment with said horizontally disposed lay-down device to receive the horizontally disposed coil therefrom, a lift-off device having coil receiving and support members disposed at the other end of said table in alignment therewith to receive a coil therefrom, a banding machine disposed adjacent said table and intermediate said horizontally disposed lay-down device and said lift-off device for operation to band a coil supported on said table in a position substantially equidistant from said lay-down device and said lift-off device, second indexing means disposed for operation to engage and progressively move a horizontally disposed coil from said lay-down device to said banding position and from thence to said coil receiving and support members of said lift-off device in two distinct substanstantially equal steps, means for removing said second indexing means from engagement with the coil disposed at each of said banding position and on said receiving and support members of said lift-off device, said second indexing means being operable lengthwise of said banding table and having means disposed to be operated to simultaneously engage a coil on said horizontally disposed lay-down device and a coil in said banding position to simultaneously move the coil from said banding position to said lift-off device and the coil from said lay-down device to said banding position, a discharge turnstile having a plurality of spaced coil receiving beds extending outwardly therefrom in a plane below said lift-off device and disposed to be progressively indexed from a coil receiving position beneath said lift-off device to a coil discharge position, means disposed to actuate said lift-off device to lower the coil carried on the support members thereof and deposit the coil on one of said coil receiving beds in said coil receiving position, and releasable means disposed to be operated to lock said discharge turnstile to maintain the beds thereof in said progressive positions during a loading or discharge operation.

4. A coil handling apparatus comprising, in combination, a loading turnstile having a plurality of spaced outwardly extending arms thereon, a movable carriage disposed on each of said arms for receiving a plurality of vertically disposed coils thereon, means for progressively indexing said arms from a loading position to a coil discharging position, a coil carrying lay-down device disposed to be pivotally moved from a vertical position adjacent said coil discharging position of said loading turnstile to a horizontal coil discharging position, means carried by said lay-down device disposed to be operated to grip the external coil carried on said carriage when the lay-down device is in said vertical position and to release said coil when the lay-down device and coil carried thereby are in the horizontal coil discharging position, actuating means disposed to engage said carriage when the arm therefor is in only the discharge position and to be operated to move said carriage forward after a coil is removed therefrom to advance the next external coil carried thereby to a position to be gripped by said gripping means of said lay-down device, a banding table disposed with a coil receiving surface thereon having one end disposed in alignment with said horizontally disposed lay-down device to receive a coil therefrom, a lift-off device having coil receiving and support members disposed at the other end of said table in alignment therewith to receive a coil therefrom, means for actuating said lift-off device between said coil receiving position and a lower coil discharge position, a banding machine disposed adjacent said table and intermediate said horizontally disposed lay-down device and said lift-off device for operation to band a coil supported on said table in a position substantially equidistant from said lay-down device and said lift-off device, second indexing means disposed for operation to engage and progressively move a coil from said lay-down device to said banding position and from thence to said coil receiving and support members of said lift-off device in two distinct substantially equal steps, means for removing said second indexing means from engagement with the coil disposed at each of said banding positions and on said receiving and support members of said lift-off device, said second indexing means being operable lengthwise of said banding table and having means disposed to be operated to simultaneously engage a coil on said horizontally disposed lay-down device and a coil in said banding position to simultaneously move the coil from said banding position to said lift-off device and the coil from said lay-down device to said banding position, a discharge turnstile having a plurality of spaced coil receiving beds extending outwardly therefrom in a plane below said lift-off device and disposed to be progressively indexed from a coil receiving position beneath said lift-off device to a coil discharge position, means carried by said lift-off device and disposed to be operated when said lift-off device is in its coil discharge position to deposit the coil carried thereby onto said coil receiving bed in said coil receiving position, and releasable means disposed to be operated to lock said discharge turnstile to maintain the beds thereof in said progressive positions during a loading or discharge operation.

5. A coil handling apparatus comprising, in combination, a loading turnstile having a plurality of spaced outwardly extending arms thereon, a movable carriage disposed on each of said arms for receiving a plurality of vertically disposed coils thereon, means for progressively indexing said arms from a coil receiving position to a coil discharging position, a coil carrying lay-down device disposed to be actuated between a vertical coil receiving position and a horizontal coil discharge position, means for actuating said lay-down device between said positions, said lay-down device being positioned when in said vertical position adjacent an arm of said loading turnstile positioned in said coil discharging position, means disposed to be actuated to move said carriage along said arm when said arm is in only said coil discharge position to thereby advance the external coil carried on said carriage into engagement with said vertically positioned lay-down device, gripping means carried by said lay-down device, means disposed to actuate said gripping means into gripping engagement with said external coil and to maintain said gripping engagement as said lay-down device is actuated to said horizontal coil discharge position and to release said gripping engagement when said lay-down device is in said discharge position, a banding table disposed in a plane in alignment with said horizontally disposed coil lay-down device to receive a coil therefrom, a coil lift-off device having coil receiving members disposed at the other end of said table in a plane in alignment therewith for receiving said coil therefrom, a banding machine disposed adjacent said table and disposed to be operated to band said coil when said coil is positioned on said table a distance substantially equal between said horizontally disposed lay-down device and said lift-off device, and indexing device disposed for operation to engage and progressively move a coil from said lay-down device to said banding position and from thence to said lift-off device in two distinct substantially equal steps, means for removing said indexing device from engagement with the coil at each of said banding position and said lift-off device, said indexing device having arms disposed to be operated to simultaneously move a coil from said banding position to said lift-off device and a coil from said lay-down device to said banding position, said coil lay-down device being disposed to be actuated to its vertical coil receiving position when said indexing arms are moved towards said lift-off device, a discharge turnstile having a plurality of spaced coil receiving beds thereon disposed to be progressively indexed from a coil receiving position to a coil discharge position, said coil receiving position being disposed beneath said lift-off device, means for lowering said coil lift-off device to a position closely adjacent said coil receiving bed in said coil receiving position to deposit a coil on said receiving bed, means for raising said lift-off device and returning its coil receiving members to a coil receiving position in alignment with said banding table, means for actuating said discharge turnstile to progressively index said receiving beds thereof from a coil receiving position to a coil discharge position, and releasable means disposed to be actuated to lock said receiving beds in said positions during a loading or unloading operation.

6. A coil handling apparatus comprising, in combination, a loading turnstile having a plurality of spaced outwardly extending arms thereon, a movable carriage disposed on each of said arms for receiving a plurality of vertically disposed coils having a predetermined inner diameter thereon, means for progressively indexing said arms from a coil receiving position to a coil discharging position, a coil carrying lay-down device disposed to be actuated between a vertical coil receiving position and a horizontal coil discharge position, means for actuating said lay-down device between said positions, said lay-down device being positioned when in said vertical position adjacent an arm of said loading turnstile positioned in said coil discharging position, means disposed to be actuated to move said carriage along said arm when said arm is in only said coil discharge position to thereby advance the external coil carried on said carriage into engagement with said vertically positioned lay-down device, gripping means carried by said lay-down device, means disposed to actuate said gripping means into gripping engagement with said external coil and to maintain said gripping engagement as said lay-down device is actuated to said horizontal coil discharge position and to release said gripping engagement when said lay-down device is in said discharge position, a banding table disposed in a plane in alignment with and having an end thereof adjacent to said horizontally disposed lay-down device to receive a coil therefrom, a coil lift-off device having coil receiving members disposed at the other end of said table in a plane in alignment therewith for receiving said coil therefrom, a banding machine disposed adjacent said table and disposed to be operated to band said coil when said coil is positioned on said table a distance substantially equal between said horizontally disposed lay-down device and said lift-off device, an indexing device having two indexing arms terminating in two coil engaging ends spaced a distance apart substantially equal to the distance between the forward face of the inner diameter of said coil as positioned in any two successive coil positions on said horizontally disposed lay-down device, on said banding table in a coil banding position, and on said lift-off device, indexing movable means for carrying said indexing device lengthwise relative to said banding table, one of said indexing arms being disposed to be moved to seat its coil engaging end in seating engagement with the forward face of the inner diameter of a coil on said horizontally disposed lay-down device, the other of said indexing arms being disposed to be moved to seat its coil engaging end in seating engagement with the forward face of the inner diameter of a banded coil in the banding position on said banding table, means for simultaneously moving said indexing arms and their coil engaging ends into said seating engagement with coils positioned at said two positions, means for actuating said indexing movable means when the coil engaging ends of said indexing arms are in said seating engagement with coils in said two positions to move said indexing movable means lengthwise with respect to said table whereby said indexing arms are effective to simultaneously move a banded coil from the banding position to said lift-off device and a second coil from said lay-down device to said banding position, said lay-down device being disposed to be actuated to its vertical coil receiving position when said indexing arms are moved towards said lift-off device, indexing means for simultaneously moving said indexing arms and their coil engaging ends from engagement with said banded coil and said second coil upon completion of a movement of said coils to said lift-off device and to said banding position, said actuating means for said indexing movable means being effective to move said indexing movable means lengthwise with respect to said table when said arm coil engaging ends are disengaged from said coils and said lay-down device is in a horizontal position to reposition said arms for operation to again engage two successive coils in said banding position and on said horizontally disposed lay-down device, and means for effecting movement of said coil lift-off device away from its coil receiving position when said indexing device is moved away therefrom and a banded coil is supported thereon to a coil discharge position.

7. A coil handling apparatus comprising in combination, a loading turnstile having a plurality of spaced outwardly extending arms thereon, a movable carriage disposed on each of said arms for receiving a plurality of vertically disposed coils having a predetermined inner diameter thereon, means for progressively indexing said arms from a coil receiving position to a coil discharging position, a coil carrying lay-down device disposed to be actuated between a vertical coil receiving position and a horizontal coil discharge position, means for actuating said lay-down device between said positions, said lay-down device being positioned when in said vertical position adjacent an arm of said loading turnstile positioned in said coil discharging position, means disposed to be actuated to move said carriage along said arm when said arm is in only said coil discharge position to thereby advance the external coil carried on said carriage into engagement with said vertically positioned lay-down device, gripping means carried by said lay-down device, means disposed to actuate said gripping means into gripping engagement with said external coil and to maintain said gripping engagement as said lay-down device is actuated to said horizontal coil discharge position and to release said gripping engagement when said lay-down device is in said discharge position, a banding table disposed in a plane in alignment with and having an end thereof adjacent to said horizontally disposed lay-down device to receive a coil therefrom, a coil lift-off device having coil receiving members disposed at the other end of said table in a plane in alignment therewith for receiving a coil therefrom, a banding machine disposed adjacent said table and disposed to be operated to band a coil positioned on said table a distance substantially equal between said horizontally disposed lay-down device and said lift-off device, an indexing device having two indexing arms terminating in two coil engaging ends spaced a distance apart substantially equal to the distance between the forward face of the inner diameter of coils positioned in any two successive coil positions on said horizontally disposed lay-down device, on said banding table in a coil banding position, and on said lift-off device, indexing movable means for carrying said indexing device lengthwise relative to said banding table, one of said indexing arms being disposed to be moved to seat its coil engaging end in seating engagement with the forward face of the inner diameter of a coil on said horizontally disposed lay-down device, the other of said indexing arms being disposed to be moved to seat its coil engaging end in seating engagement with the forward face of the inner diameter of a banded coil in the banding position on said banding table, means for simultaneously moving said indexing arms and their coil engaging ends into seating engagement with coils positioned at said two positions, means for actuating said indexing movable means when the coil engaging ends of said indexing arms are in seating engagement with coils in said two positions to move said indexing movable means lengthwise with respect to said table whereby said indexing arms are effective to simultaneously move a banded coil from the banding position to said lift-off device and a second coil from said lay-down device to said banding position, said lay-down device being disposed to be actuated to its vertical coil receiving position when said indexing arms are moved towards said lift-off device, means for simultaneously moving said indexing arms and their coil engaging ends from engagement with said banded coil and said second coil upon completion of a movement of said coils to said lift-off device and to said banding position, said actuating means for said indexing movable means being effective to move said indexing movable means lengthwise with respect to said table when said arm coil engaging ends are disengaged from said coils and said lay-down device is in a horizontal position to reposition said indexing arms for operation to again engage two successive coils in said banding position and on said horizontally disposed lay-down device, said lift-off device having a pair of supporting shoes disposed to be actuated to a supporting position beneath a banded coil seated on said coil receiving members thereof, actuating means disposed to be operated to move said coil receiving members of said lift-off device away from a coil engaging position when said supporting shoes are in said supporting position whereby said banded coil is supported on said shoes only, a discharge turnstile having a plurality of spaced coil receiving beds thereon disposed to be progressively indexed from a coil receiving position beneath said lift-off device to a coil discharge position, means for lowering said lift-off device when said indexing device is moved away therefrom and a banded coil is supported on said shoes to a position closely adjacent said coil receiving bed in said coil receiving position, actuating means to withdraw said shoes from their coil supporting position to deposit said banded coil on said receiving bed, means for raising said lift-off device and for returning said coil receiving members thereof to a coil receiving position in alignment with said banding table, means for actuating said discharge turnstile to progressively index said receiving beds thereof from a coil receiving position to a coil discharge position, and releasable means disposed to be actuated to lock said receiving beds in said positions during a loading or unloading operation.

8. In a coil handling apparatus for transporting a coil from a coil receiving surface in a predetermined upper plane to and through a predetermined lower plane to a discharge position, the combination comprising, a turnstile having a plurality of horizontally extending spaced arms carried thereby and disposed in said predetermined lower plane to be progressively indexed between a coil loading position and a coil discharge position, a fixed support member carried by said turnstile and disposed in a fixed position above and in a spaced relation to one of said arms disposed in said loading position, a plurality of spaced downwardly depending elongated arms pivotally carried in opposed relation on said fixed support member, each of said elongated arms terminating at its lower end in a coil receiving surface formed of a plurality of parallel spaced roller members, means connected to be operated to pivotally move said elongated arms to position said roller members carried thereby in said predetermined upper plane for receiving a coil thereon above said predetermined lower plane and to move said elongated arms to an open position to move said roller members to an open coil discharge position, a coil lowering member having a pair of opposed coil supporting lugs and an interconnecting linkage therefor slidably carried by said fixed support member for vertical movement relative thereto between an upper coil receiving position and a lower coil discharge position, means carried by said fixed support member and disposed to be operated for effecting said vertical movement of said coil lowering member, said coil lowering member being disposed between said elongated arms when in said upper coil receiving position, means carried by said coil lowering member and disposed to be operated to actuate said linkage mechanism when a coil is carried on said roller members of said elongated arms to seat said opposed lugs therebetween beneath said coil in a coil supporting relation, said pivotal operating means for said elongated arms being disposed to be operated to move said roller members to said open coil discharge position to deposit a coil carried thereby onto said opposed supporting lugs in said predetermined upper plane, said linkage operating means being disposed to be operated when said coil lowering member is in its lower coil discharge position adjacent said predetermined lower plane to open said coil supporting lugs to a coil discharge position to deposit a coil carried thereby onto one of said elongated arms of said turnstile in said lower plane coil loading position, said vertical movement operating means being disposed to raise said lowering member to return it to its upper coil receiving position, said pivotal operating means also being disposed to be operated to return said roller members to their predetermined upper coil receiving plane when said lowering member is in its upper coil receiving position, means carried by said turnstile disposed to be operated to index said arms thereof between said coil loading and coil discharge positions, and releasable means disposed to be operated to lock said arms in said positions to prevent an accidental movement therefrom during a loading or discharge operation.

9. In a coil handling apparatus for transporting a coil from a coil receiving surface in a predetermined upper plane to and through a predetermined lower plane to a discharge position, the combination comprising, a turnstile having a plurality of horizontally extending spaced arms carried thereby and disposed to be progressively indexed between a coil loading position and a coil discharge position, means carried by said turnstile disposed to be operated for indexing said arms between said positions, releasable means disposed to be operated to lock said arms in said positions to prevent an accidental movement therefrom, a coil receiving member disposed in a normal horizontal coil receiving position on each of said arms, said coil receiving members being normally disposed in said common predetermined lower plane, a fixed support member carried by said turnstile in a fixed position above one of said coil receiving members when the arm associated therewith is in said loading position, a plurality of spaced elongated arms pivotally carried in opposed relation on said support member, each of said elongated arms terminating in a coil receiving surface formed of a plurality of parallel spaced roller members disposed in said predetermined upper plane above said predetermined lower plane of one of said coil receiving members on its associated horizontal arm in a coil loading position, means connected to be operated to pivotally move said elongated arms to move said roller members carried thereby between said predetermined upper plane and an open coil discharge position, a coil lowering member slidably mounted on said supporting member for vertical movement from a coil receiving position between said elongated arms to a lower coil discharge position above one of said coil receiving members on its associated horizontal arm in a coil loading position, said coil lowering member having a pair of opposed coil supporting lugs and an interconnecting linkage therefor disposed to be operated to position said lugs in a coil receiving position between said spaced roller members when said roller members are in said predetermined upper plane, means carried by said lowering member for operating said linkage to position said lugs in said coil receiving position, said pivotal operating means for said elongated arms being disposed to be operated to move said roller members to said open coil discharge position to deposit a coil carried thereby onto said supporting lugs, means carried by said support member disposed to be operated to lower said coil lowering member to a coil discharge position above said one of said coil receiving members on its associated horizontal arm in said loading position, said linkage operating means being disposed to be operated when said coil lowering member is in its coil discharge position to move said lugs away from a coil supporting position to discharge a coil therefrom onto said one of said coil receiving members in said coil loading position in said predetermined lower plane, said lowering means also being disposed to be operated to raise said lowering means to its coil receiving position between said elongated arms, said pivotal operating means also being disposed to be operated to return said roller members to their said predetermined upper plane when said coil lowering member is in its coil receiving position, said linkage operating means being disposed to be operated when a coil is carried on said roller members to again position said lugs in a coil receiving position between said roller members, each of said coil receiving members being disposed to be moved on its associated horizontal arm in said predetermined lower plane under predetermined operating conditions from its normal coil receiving position to a coil discharge position, and means disposed to be operated when one of said horizontal arms is in a coil discharge position to effect said movement of said coil receiving member thereon to a coil discharge position, said last operating means also being disposed to be operated to return said coil receiving member to its normal coil receiving position on said horizontal arm before said arm is indexed away from said coil discharge position.

10. In a coil handling apparatus for receiving and lowering a coil to a discharge position, the combination comprising, a fixed support member, two pairs of spaced elongated arms pivotally mounted in opposed relation on said support member and having coil receiving surfaces formed on the ends thereof for supporting a coil thereon, each of said surfaces comprising a plurality of spaced roller members, means disposed to be operated to effect a simultaneous pivotal movement of both pairs of said arms to move said roller members carried thereby between a coil receiving position where said roller members are in a common horizontal plane and an open coil discharge position, a coil lowering member slidably mounted on said supporting member and disposed for vertical movement from a coil receiving position between said arms to a lower coil discharge position, said coil lowering member having a pair of opposed coil supporting lugs and an interconnecting linkage therefor disposed to be operated when said coil lowering member and said roller members are in a coil receiving position to position said lugs between said roller members, means carried by said coil lowering member for operating said linkage to position said lugs in said coil receiving position, said operating means for said arms being disposed to be operated to move said roller members away from said coil receiving position to deposit a coil therefrom onto said supporting lugs, means carried by said support member disposed to be operated to lower said coil lowering member from said coil receiving position to a predetermined coil discharge position, said linkage operating means being disposed to be operated when said coil lowering member is in a coil discharge position to move said lugs away from a coil supporting position to discharge a coil therefrom, said lowering means also being disposed to be operated to return said coil lowering member to its upper coil receiving position, said operating means for said arms also being disposed to be operated to move said roller members to their coil receiving position when said coil lowering member is in its upper coil receiving position, and said linkage operating means being disposed to be operated when a coil is carried on said roller members to again position said opposed lugs in a coil receiving position between said roller members.

11. In a coil handling apparatus, a turnstile having a plurality of horizontally extending spaced arms thereon disposed to be progressively indexed from a coil loading position to a coil discharge position, means for indexing said arms between said positions, releasable means disposed to be operated for locking said arms in said positions to prevent an accidental movement therefrom, a coil receiving member carried by and disposed in a normal coil receiving position on each of said arms, said coil receiving member being disposed to be moved on its associated arm under predetermined operating conditions to a coil discharge position, and means disposed to be operated when one of said arms is in a coil discharge position to effect said movement of said coil receiving member thereon to move a coil carried thereby to a position to be discharged therefrom and from said arm, said operating means also being disposed to be operated to return said coil receiving member to said coil receiving position on said arm before said arm is indexed away from said coil discharge position.

12. In a coil handling apparatus, a turnstile having a rotatable sleeve thereon, a plurality of horizontally extending spaced arms carried by said sleeve and disposed to be progressively indexed from a coil loading position to a coil discharge position, operating means disposed to be connected to said sleeve and to be operated when so connected to index said sleeve and said arms carried thereby between said positions, connecting means disposed to be operated to connect said operating means to said sleeve only during a predetermined indexing movement thereof, releasable means disposed to be operated for locking said arms in said positions to prevent an accidental movement thereof, a coil receiving member carried by and disposed in a normal coil receiving position on each of said arms, said coil receiving member being disposed to be moved under predetermined operating conditions on its associated arm to a coil discharge position, and means disposed to be operated when one of said arms is in a coil discharge position to effect said movement of said coil receiving member thereon to a coil discharge position, said operating means also being disposed to be operated to return said coil receiving member to its coil receiving position on said arm before said arm is indexed away from said coil discharge position.

13. In a coil handling apparatus, a turnstile having a plurality of horizontally extending spaced arms thereon disposed to be progressively indexed from a coil loading position to a coil discharge position, means for indexing said arms between said positions, releasable means disposed to be operated to lock said arms in said positions to prevent an accidental movement therefrom, a coil receiving carriage for each of said arms for receiving a plurality of vertically disposed coils thereon, each of said carriages being slidably carried on its associated arm and movable lengthwise relative thereto from a coil receiving position to a coil discharge position under predetermined operating conditions, and actuating means disposed to be automatically connected to said carriage when the arm associated therewith is in the coil discharge position, said actuating means being disposed to be operated to effect a progressive movement of said carriage along said arm to progressively advance said vertically disposed coils thereon to a coil discharge position, said actuating means also being disposed to be operated to return said carriage along said arm to a coil receiving position thereon, said actuating means being disposed to be automatically disconnected from said carriage in said coil receiving position when said arm is indexed away from said coil discharge position.

14. In a coil handling apparatus, a turnstile having a plurality of horizontally extending spaced arms thereon disposed to be progressively indexed from a coil loading position to a coil discharge position, means for indexing said arms between said positions, releasable means disposed to be operated to lock said arms in said positions to prevent an accidental movement therefrom, a coil receiving bed having a plurality of spaced roller members thereon carried by and disposed on each arm with said roller members in a horizontal plane to form a coil receiving surface thereon, each of said beds being pivotally mounted on its associated arm and disposed to be tilted relative thereto to a coil discharge position under predetermined operating conditions, brake means carried by each of said arms and disposed to frictionally engage certain of said roller members of said bed associated therewith when said bed is not tilted to prevent rotation of said roller members, and means disposed to be operated when one of said arms is in the coil discharge position to engage the bed associated therewith to tilt said bed about its pivotal mounting thereon to thereby disengage said brake means from said roller members whereby said bed is in a coil discharging position, said bed operating means also being disposed to be operated to return said bed to a coil receiving position before said arm is indexed away from the coil discharge position.

15. In a coil handling apparatus for effecting a step-by-step movement of a coil from a supply station across a banding table to a discharge station all of which are in the same horizontal plane, the combination comprising, a support member disposed lengthwise of and adjacent said banding table, a carriage movably disposed on said support member, means disposed to be operated to effect reciprocal movement of said carriage lengthwise of and on said support member, a pair of pivotally mounted spaced arms carried by said carriage, said arms being disposed to extend outwardly from said carriage over said handling table and terminating in coil engaging ends, said coil engaging ends being spaced a distance apart equal to the distance between said supply station and a banding position on said table and to the discharge between said banding position and said discharge station, and means disposed to be operated to effect a simultaneous pivotal movement of said spaced arms to actuate said coil engaging ends thereof between coil engaging and coil disengaging positions, said carriage operating means being effective when said engaging ends are in coil engaging positions to move said carriage and said engaging ends forward to simultaneously move a coil from said banding position to said discharge station and a coil from said supply station to said banding position, said carriage operating means also being effective when said coil engaging ends are in coil disengaging positions to return said carriage to a position where said pivotal operating means is effective to again actuate said coil engaging ends into coil engaging positions.

References Cited in the file of this patent

UNITED STATES PATENTS

| | | |
|---|---|---|
| 2,617,353 | Ranney | Nov. 11, 1952 |
| 2,700,332 | Donald | Jan. 25, 1955 |
| 2,725,137 | Muddiman | Nov. 29, 1955 |
| 2,905,078 | Laine | Sept. 22, 1959 |
| 2,926,598 | Dentzer et al. | Mar. 1, 1960 |
| 2,954,135 | Iversen | Sept. 27, 1960 |
| 2,996,198 | Packman | Aug. 15, 1961 |

FOREIGN PATENTS

| | | |
|---|---|---|
| 85,066 | Netherlands | May 15, 1957 |
| 929,831 | Germany | July 4, 1955 |